US011384170B2

(12) United States Patent
Reznichenko et al.

(10) Patent No.: US 11,384,170 B2
(45) Date of Patent: Jul. 12, 2022

(54) PROCESS FOR THE PREPARATION OF SOLID CATALYST

(71) Applicant: BOREALIS AG, Vienna (AT)

(72) Inventors: Alexander Reznichenko, Porvoo (FI); Noureddine Ajellal, Porvoo (FI); Joseph Thorman, Moorhead, MN (US); Bernard Binks, Yorkshire (GB)

(73) Assignee: Borealis AG, Vienna (AT)

( * ) Notice: Subject to any disclaimer, the term of this patent is extended or adjusted under 35 U.S.C. 154(b) by 36 days.

(21) Appl. No.: 16/771,307

(22) PCT Filed: Dec. 19, 2018

(86) PCT No.: PCT/EP2018/085992
§ 371 (c)(1),
(2) Date: Jun. 10, 2020

(87) PCT Pub. No.: WO2019/122016
PCT Pub. Date: Jun. 27, 2019

(65) Prior Publication Data
US 2021/0179744 A1 Jun. 17, 2021

(30) Foreign Application Priority Data
Dec. 21, 2017 (EP) .................................... 17209882

(51) Int. Cl.
C08F 4/6592 (2006.01)
C08F 10/02 (2006.01)
(Continued)

(52) U.S. Cl.
CPC ............ C08F 4/65927 (2013.01); C07F 7/00 (2013.01); C08F 4/65916 (2013.01); C08F 10/02 (2013.01); C08F 10/06 (2013.01)

(58) Field of Classification Search
CPC .... C08F 4/6592; C08F 4/65912; C08F 10/02; C08F 10/06
See application file for complete search history.

(56) References Cited

U.S. PATENT DOCUMENTS 4,399,054 A 8/1983 Ferraris et al.
4,665,208 A 5/1987 Welborn et al.
(Continued)

FOREIGN PATENT DOCUMENTS

EP 0561476 A1 9/1993
EP 0594218 A1 4/1994
(Continued)

OTHER PUBLICATIONS

International Search Report and Written Opinion dated Apr. 5, 2019, from International Application No. PCT/EP2018/085992, 14 pages.
(Continued)

Primary Examiner — Caixia Lu
(74) Attorney, Agent, or Firm — Meunier Carlin & Curfman LLC

(57) ABSTRACT

A process for the preparation of a solid olefin polymerization catalyst or a solid olefin polymerization catalyst component comprising the steps of: (a) forming a liquid/liquid emulsion of (i) a first organic liquid comprising at least one olefin polymerization catalyst component and (ii) an optionally halogenated hydrocarbon liquid immiscible therewith; where the first organic liquid forms the dispersed phase and the optionally halogenated hydrocarbon liquid forms the continuous phase of the liquid/liquid emulsion and wherein the dispersed phase forms droplets in the continuous phase; and (b) transforming the droplets of the dispersed phase to solid particulate particles comprising said at least one olefin polymerization catalyst component, wherein the liquid/liquid emulsion is stabilized with a solid particulate stabilizer.

36 Claims, 2 Drawing Sheets

(51) Int. Cl.
  *C08F 10/06* (2006.01)
  *C07F 7/00* (2006.01)
  *C08F 4/659* (2006.01)

(56) References Cited

U.S. PATENT DOCUMENTS

| | | | |
|---|---|---|---|
| 4,874,734 | A | 10/1989 | Kioka et al. |
| 4,908,463 | A | 3/1990 | Bottelberghe |
| 4,924,018 | A | 5/1990 | Bottelberghe |
| 4,952,540 | A | 8/1990 | Kioka et al. |
| 4,968,827 | A | 11/1990 | Davis |
| 5,091,352 | A | 2/1992 | Kioka et al. |
| 5,103,031 | A | 4/1992 | Smith |
| 5,157,137 | A | 10/1992 | Sangokoya |
| 5,204,419 | A | 4/1993 | Tsutsui et al. |
| 5,206,199 | A | 4/1993 | Kioka et al. |
| 5,235,081 | A | 8/1993 | Sangokoya |
| 5,248,801 | A | 9/1993 | Sangokoya |
| 5,308,815 | A | 5/1994 | Sangokoya |
| 5,329,032 | A | 7/1994 | Tran et al. |
| 5,391,529 | A | 2/1995 | Sangokoya |
| 5,391,793 | A | 2/1995 | Marks et al. |
| 5,693,838 | A | 12/1997 | Sangokoya et al. |
| 5,731,253 | A | 3/1998 | Sangokoya |
| 5,731,451 | A | 3/1998 | Smith et al. |
| 5,744,656 | A | 4/1998 | Askham |
| 2013/0289229 | A1 | 10/2013 | Castro et al. |

FOREIGN PATENT DOCUMENTS

| | | | |
|---|---|---|---|
| EP | 0279586 | B1 | 5/1994 |
| EP | 0537130 | B1 | 9/1996 |
| EP | 0423101 | B2 | 5/2006 |
| EP | 1803743 | A1 | 7/2007 |
| EP | 2065405 | A1 | 6/2009 |
| EP | 2186832 | A1 | 5/2010 |
| EP | 2386582 | A1 | 11/2011 |
| EP | 2532687 | A2 | 12/2012 |
| EP | 2600130 | B1 | 2/2016 |
| WO | 1994010180 | A1 | 5/1994 |
| WO | 1997010248 | A1 | 3/1997 |
| WO | 1997028170 | A1 | 8/1997 |
| WO | 1998040331 | A1 | 9/1998 |
| WO | 1998046616 | A1 | 10/1998 |
| WO | 1998049208 | A1 | 11/1998 |
| WO | 1998056831 | A1 | 12/1998 |
| WO | 1999010353 | A1 | 3/1999 |
| WO | 1999012981 | A1 | 3/1999 |
| WO | 1999019335 | A1 | 4/1999 |
| WO | 1999041290 | A1 | 8/1999 |
| WO | 2000008034 | A1 | 2/2000 |
| WO | 2000034341 | A2 | 6/2000 |
| WO | 2001070395 | A2 | 9/2001 |
| WO | 2002002576 | A1 | 1/2002 |
| WO | 2003000757 | A1 | 1/2003 |
| WO | 2003005194 | A2 | 1/2003 |
| WO | 2003051934 | A2 | 6/2003 |
| WO | 2005105863 | A2 | 11/2005 |
| WO | 2006069733 | A1 | 7/2006 |
| WO | 2006097497 | A1 | 9/2006 |
| WO | 2007107448 | A1 | 9/2007 |
| WO | 2007116034 | A1 | 10/2007 |
| WO | 2009027075 | A2 | 3/2009 |
| WO | 2009054832 | A1 | 4/2009 |
| WO | 2011076443 | A1 | 6/2011 |
| WO | 2011076618 | A1 | 6/2011 |
| WO | 2011138211 | A1 | 11/2011 |
| WO | 2012001052 | A2 | 1/2012 |
| WO | 2012143303 | A1 | 10/2012 |
| WO | 2013007650 | A1 | 1/2013 |
| WO | 2015062936 | A1 | 5/2015 |

OTHER PUBLICATIONS

Binks, Bernard P., and Andrew T. Tyowua. "Oil-in-oil emulsions stabilised solely by solid particles." Soft Matter 12.3 (2016): 876-887.

Chevalier, Yves, and Marie-Alexandrine Bolzinger. "Emulsions stabilized with solid nanoparticles: Pickering emulsions." Colloids and Surfaces A: Physicochemical and Engineering Aspects 439 (2013): 23-34.

Britovsek, George JP, Vernon C. Gibson, and Duncan F. Wass. "The search for new-generation olefin polymerization catalysts: life beyond metallocenes." Angewandte Chemie International Edition 38.4 (1999): 428-447.

Enders et al., "Die fluorige Phase: Organische Chemie mit hochfluorierten Reagenzien und Lösungsmitteln", Chemie in unserer Zeit, Jahrg., 2000, 6, 34, 382-393. [Endres, A., and G. Maas. "The fluorous phase: Organic chemistry with highly fluorinated reagents and solvents." Chemie in Unserer Zeit 34.6 (2000): 382-393.] English Abstract included.

Nostro, Pierandrea Lo. "Phase separation properties of fluorocarbons, hydrocarbons and their copolymers." Advances in colloid and interface science 56 (1995): 245-287.

Atwood, "Anionic and Cationic Organoaluminum Compounds" Coord. Chem. Alum., 1993, 197-32.

Holbrey, John D., et al. "Liquid clathrate formation in ionic liquid-aromatic mixtures." Chemical Communications 4 (2003): 476-477.

Scott K. Spear, "Liquid Clathrates", Encyclopedia of Supramolecular Chemistry, 2001, 804-807.

1a:

1b:

Comparative 1    Ex A    Ex B

Ex D

PROCESS FOR THE PREPARATION OF SOLID CATALYST

This invention relates to a new process for the preparation of solid catalysts or solid catalyst components for use in olefin polymerisation. In particular, the invention relates to a process for producing solid catalyst components or a solid catalyst itself from an oil-in-oil two-phase emulsion system. In one embodiment, the invention relates to a process for producing solid single-site catalysts without using external inert solid support material. The invention also relates to a solid catalysts obtained by the process and the use of the catalysts in olefin polymerisation.

BACKGROUND

At the beginning of the development of new catalyst systems only homogeneous catalyst systems were available. Such homogeneous catalyst systems are solutions of one or more catalyst components, e.g. a transition metal compound and optionally a cocatalyst. Homogeneous systems are used as liquids in the polymerisation process. Such systems have a satisfactory catalytic activity, but polymers produced using solution phase polymerisation have poor morphology (e.g. the polymer obtained is in a form of a fluff having a low bulk density). As a consequence, operation of slurry and gas phase reactors using a homogeneous catalyst system causes problems in practice, for instance in terms of reactor fouling.

To overcome the problems of the homogeneous catalyst systems, supported catalyst systems have been developed. These supported systems, known as heterogeneous catalyst systems, comprise carrier materials, such as porous organic and inorganic support materials, like silica, aluminoxane or porous polymeric materials onto which the active catalyst compounds are loaded or supported.

However, supported catalyst systems also have problems. To mention only one among many, it is difficult to get an even distribution of the catalyst components in the porous carrier material. Further leaching of the catalyst components from the support can occur. Such drawbacks lead to an unsatisfactory polymerisation behavior of the catalyst, and as a result, the morphology of the polymer product thus obtained is also poor. Catalyst morphology, and due to the replica effect morphology of polymer particles is highly dependent on the morphology of the support material. Further such classic heterogeneous catalyst systems show reduced catalytic activity, which is of course detrimental, as the catalyst amount must be increased, which in turn leads to polymer products contaminated with rather high amounts of catalyst residues including silica residues. Further, carrier residues, like silica or $MgCl_2$ residues, might also be detrimental in some final applications, like in some film applications, e.g. in capacitor films More recently, solid catalysts have been developed using emulsion solidification technology for single-site and Ziegler-Natta catalysts as first described in WO03/05194 and WO03/000757. These solid catalysts are defined to be free of an external support material and are spherical particles with low porosity and surface area. Sometimes these catalysts are also called "solid, unsupported catalysts". These catalysts are prepared using emulsion-solidification method, i.e. solid catalyst is obtained by solidifying the droplets of the dispersed phase of the emulsion. In order to form and/or stabilize the emulsion, surfactants/emulsifiers are used in the process, typically specific fluorinated hydrocarbons or other known surfactants, like polymethacrylates. Such catalyst systems enable an increase in the output rate of polymers, since the bulk density of the polymerised product can be increased. Catalyst particles prepared by such process are ideally spherical with narrow particle size distribution. However, the drawback is that the preparation process is very sensitive as re used chemicals and physical conditions.

Many prior art catalysts have, however, a general drawback relating to their tendency to dissolve in the polymerisation medium, and thus causing undesired fouling in the reactors. Thus, there remains still some work to do to improve the properties of the catalyst, especially in terms of the morphology of the forming polymer.

$MgCl_2$ based catalyst carriers for Ziegler-Natta catalysts have also been manufactured by using emulsion technology, which has been known since decades, as described among others in U.S. Pat. No. 4,399,054 and WO2012143303. These catalysts are then used as external carriers for catalyst manufacturing.

Moreover, the catalyst shall be not only suitable for specific processes for producing desired polymers but general environmental concerns require that the process materials are safer. Thus there is the strong need to develop preparation methods of catalysts based on materials which promote sustainability and which are easily commercially accessible and thus well priced.

Much effort has been put into improving the methods for preparing support-free single-site catalysts as described in WO 03/051934. Most research since has been focused at improving the emulsification/solidification technology in which an emulsion is formed wherein the continuous phase, in which a solution of the catalyst components forms the dispersed phase in the form of droplets, is immiscible with said catalyst component solution. As indicated above, the preparation process is very sensitive and control of the morphology of the catalyst particles, like particle size, particle size distribution, and desired structure of the particles is demanding. In addition, this process is limited by its use of fluorinated solvents and fluorinated surfactants which are not environmentally friendly.

WO 2011/138211 describes an improved and suitable process for preparing solid metallocene catalyst systems with the emulsion/solidification technology, in which a liquid clathrate constitutes the dispersed phase of the emulsion and the solvent used for the continuous phase of the emulsion is a non-reactive fluorinated synthetic oil.

Unfortunately such catalyst systems, prepared by the emulsification/solidification technology comprising a metallocene catalyst in combination with an aluminoxane co-catalyst, have also some disadvantages, even when having the dispersed phase in form of a liquid clathrate.

For example, such catalyst systems have a tendency to dissolve to some extent in common polymerisation media. The solubility can lead to catalyst leaching, which is further associated with reactor fouling and sheeting.

Recently it has been found that solid catalysts comprising a metallocene catalyst in combination with an aluminoxane co-catalyst can be obtained from a solution without applying the emulsion/solidification technology. EP 2 386 582 A1 describes a process in which a solid catalyst is obtained by preparing a liquid clathrate from aluminoxane, organometallic compound (metallocene) and a compound being able to form lattice with aluminoxane and metallocene, and a hydrocarbon compound, and subsequent precipitation. The compound being able to form lattice with aluminoxane and metallocene is said to be either M-X compound or an organosilicon compound, and precipitation is carried out with silicon oil. From this precipitation technology, solid catalyst particles could be obtained with improved leaching properties, however, this approach resulted in solid catalyst particles with lower catalytic activity compared to similar solid catalyst particles obtained by the emulsion/solidification technology. In this respect exceptionally low catalytic activities in propylene polymerisation could be observed, in particular when catalysts were prepared in the presence of siloxanes. Further, precipitation method easily results in catalyst particles having in-homogeneous morphology, i.e. controlling of the formation of the solid material is demanding.

Thus the object of the present invention is to find an improved process for the manufacture of solid catalyst components and solid catalysts for use in olefin polymerisation. Especially, the object of the present invention is to provide a process where the morphology of the catalyst components and catalysts is easy to control in order to get a solid material with desired morphology, and still being at least a reasonably robust manufacturing process. Further, the object of the invention is to provide a process for manufacturing of solid catalyst components and solid catalysts, where harmful and non-desired surfactants, e.g. fluorinated organic surfactants are not used. In addition, the process of the invention allows production of catalysts without using any fluorinated organic surfactants nor any fluorinated hydrocarbon solvents.

According to the process of the invention solid catalysts are produced without the need of external support materials but still having an improved morphology. Such catalysts render the production of polymers in an efficient manner, i.e. using said solid catalysts which are less soluble in the polymerisation media, and are obtained by a reliable process yielding catalyst with high catalytic activities towards olefins such as propylene and ethylene, in particular towards propylene. In addition, using the method of the invention, non-desired surfactants, e.g. fluorinated organic compounds as surfactants, can be avoided, i.e. not used in the preparation of the catalysts.

The process of the invention is based on using an oil-in-oil emulsion system, out of which the solid particles (catalyst components/precursors or catalysts) are obtained by solidification, however, without using any surfactants as used in emulsions of the prior art for producing catalyst components or catalysts.

In general, the emulsions can be stabilized against phenomenon such as coagulation, coalescence, and Ostwald ripening by surfactants and/or solid particles. Surfactants are compounds that lower the surface tension (or interfacial tension) between two liquids or between a liquid and a solid or liquid and a gas.

In the present invention, no surfactants need to be employed, but instead a solid particulate stabilizer is used. Oil-in-oil emulsions stabilized solely by solid particles are disclosed in Bernard P. Binks and Andrew T. Tyowua Soft Matter, 2016, 12, 876. Emulsions stabilized with solid nanoparticles i.e. so called Pickering emulsions are disclosed in Yves Chevalier*, Marie-Alexandrine Bolzinger, Colloids and Surfaces A: Physicochem. Eng. Aspects 439 (2013) 23-34. In these prior art documents the target is to get a stabilized emulsion. Such emulsions may be typically used e.g. in cosmetics. Formation of any solid particles out of the emulsion is not discussed.

Thus, use of solid particles as emulsion stabilizers for producing olefin polymerization catalyst components or catalysts, or a process for producing olefin polymerization catalyst components or catalysts using an oil-in-oil system, where emulsion is stabilized with solid particulate material is not disclosed in any prior art documents.

Thus, the process for production catalyst components or catalysts of the invention is based on using oil-in-oil system, i.e. where the liquid components are essentially immiscible with each other and that through proper mixing form a dispersed two-phase system, i.e. an emulsion. Instead of using surfactants, a solid particulate stabilizer is used to stabilize the emulsion. Using said solid particulate material instead of surfactants the emulsion is successfully stabilized. Moreover, the solid stabilizer aids the subsequent controlled solidification of the dispersed phase with advantageous morphology control.

In one specific embodiment, the present invention requires that the solid catalyst is produced without any surfactants, e.g. without any fluorinated chemicals used as surfactants. In another embodiment no fluorinated chemicals are used in the catalyst manufacturing process (like as surfactants and solvents).

The solid catalysts produced have good catalyst activity.

SUMMARY OF INVENTION

Viewed from one aspect, the invention provides a process for the preparation of a solid olefin polymerisation catalyst or a solid olefin polymerisation catalyst component comprising the steps of:
(a) forming a liquid/liquid emulsion of (i) a first organic liquid comprising at least one olefin polymerization catalyst component and (ii) an optionally halogenated hydrocarbon liquid immiscible therewith,
  where the first organic liquid forms the dispersed phase and the optionally halogenated hydrocarbon liquid forms the continuous phase of the liquid/liquid emulsion and wherein the dispersed phase forms droplets in the continuous phase; and
(b) transforming the droplets of the dispersed phase to solid particulate particles comprising said at least one olefin polymerization catalyst component,
  wherein the liquid/liquid emulsion is stabilized with a solid particulate stabilizer.

Viewed from another aspect, the present invention is directed to a process for the preparation of a solid olefin polymerisation catalyst or a solid olefin polymerisation catalyst component comprising the steps of:
(a) forming a liquid liquid emulsion by contacting (i) a homogeneous solution comprising an organometallic compound (C) and a first organic liquid with (ii) an optionally halogenated hydrocarbon liquid immiscible therewith in the presence of a solid particulate stabilizer so as to form a liquid liquid emulsion which comprises said homogeneous solution dispersed in the form of droplets in the optionally halogenated hydrocarbon liquid, and
(b) solidifying said droplets to form solid particles.

In a further specific embodiment the present invention is directed to a process for the preparation of a solid catalyst system (CS) comprising the steps of:
(i) preparing a liquid clathrate (LC) comprising a mixing step of an aluminoxane (A), an aromatic compound (AC) and a polarity modifier (PM), wherein the mol-ratio between the a polarity modifier (PM) and aluminum (Al) of the aluminoxane (A) [(PM)/(Al)] is preferably equal or below 0.1;
(ii) mixing said liquid clathrate (LC) with an organometallic compound (C) to obtain a liquid mixture (MI);
(iii) contacting the liquid mixture (MI) with a hydrocarbon liquid immiscible with the liquid mixture (MI), e.g. an aromatic solvent, in the presence of solid particulate stabilizer to form an liquid/liquid emulsion system, which comprises said liquid mixture dispersed in the liquid immiscible therewith;
(iv) precipitating the solid catalyst system (CS) out of said emulsion by adding a saturated aliphatic compound to said emulsion;
(v) optionally recovering particles of the solid catalyst system (CS).

In one further embodiment, the invention provides a process for the preparation of a solid catalyst system (CS) comprising the steps of:
(i) preparing a liquid clathrate (LC) comprising a mixing step of an aluminoxane (A), an aromatic compound (AC) and a polarity modifier (PM), wherein the mol-ratio between the a polarity modifier (PM) and aluminum (Al) of the aluminoxane (A) [(OS)/(Al)] is preferably equal or below 0.1;
(ii) mixing said liquid clathrate (LC) with an organometallic compound (C) for obtaining a liquid mixture (MI);
(iii) contacting the liquid mixture with solid particulate stabilizer to form catalyst mixture (CM);
(iv) forming a liquid liquid emulsion by contacting said catalyst mixture with a hydrocarbon liquid immiscible with the catalyst mixture, e.g. an aromatic solvent;
(v) precipitating the solid catalyst system (CS) out of said emulsion by adding a saturated aliphatic compound to said emulsion;
(vi) optionally recovering particles of the solid catalyst system (CS).

Viewed from another aspect the invention provides a solid catalyst obtained by a process as herein before defined.

In particular, a solid catalyst of the invention comprises an aluminoxane (A), an organometallic compound (C), and solid particulate stabilizer; and the solid catalyst is unsupported, i.e. no external carrier material is present in the catalyst, i.e. no external carrier material is added to the catalyst synthesis.

In particular, a solid catalyst system (CS) of the invention comprises an aluminoxane (A), an organo-silicon compound (OS), wherein the mol-ratio between the organo-silicon compound (OS) and aluminum (Al) of the aluminoxane (A) [(OS)/(Al)] is below 0.08, an organometallic compound (C), and solid particulate stabilizer; and the solid catalyst system (CS) is unsupported, i.e. no external carrier material is present.

Surprisingly it has been found out that with the above defined processes solid catalyst can be obtained, which enable a person skilled in the art to efficiently produce polymers having good morphology and with acceptable activity.

When applying said solid catalyst prepared by the inventive process in polymerisation processes, high catalytic activities could be observed without the occurrence of reactor fouling.

Due to the use of separate process steps for producing liquid clathrate (LC) and further liquid catalyst mixture (MI) component, the second process of the invention is especially easy to control.

The solid catalyst obtained according to the instant process is preferably solid without an external catalytically inert support material. In this regard, the solid particulate stabilizer that is used according to the invention does not act as a support for the catalyst, but by definition acts as an oil-in-oil emulsion stabilizer, i.e. it acts as a Pickering emulsion stabiliser. A Pickering emulsion is an emulsion that is stabilized by solid particles (for example nanosilica) which adsorb onto the interface between the two phases.

Typically Pickering emulsions are emulsions of oil and water. When oil and water are mixed and small oil droplets are formed and dispersed throughout the water, eventually the droplets will coalesce to decrease the amount of energy in the system. However, if solid particles are added to the mixture, they will bind to the surface of the interface and prevent the droplets from coalescing, making the emulsion more stable. The solid stabilizing particles are necessary smaller than the droplets in the Pickering emulsions.

In the present invention, emulsion is not an oil-in-water emulsion, but an oil-in oil emulsion, i.e. based on organic media. The solid particulate stabilizers act to stabilize these emulsions. These solid particles are preferably nanoparticles.

One preferred solid particulate stabilizer is hydrophobic silica particles. These are prepared by the chemical modification (coating) of silica e.g. with DCMDS (dichlorodimethylsilane) and can contain varied percentage of residual silanol groups. Preferably, hydrophobic silicas of the invention contain below 50% of the residual silanol groups and are available commercially (e.g. HDK grades from Wacker).

Particles of hydrophobized nanosilicas are too small to act as a support medium. The particles are nanosize with very high surface area. The typical size of the primary particles of hydrophobized nanosilicas ranges from 5 to 50 nm, and the respective particle aggregates are typically sized between 100-500 nm.

In contrast, an external catalytically inert support material is a material which is used to decrease solubility of the catalyst systems in media which are generally used in polymerization processes. Typical external catalytically inert support materials are organic and inorganic support materials, like silica, solid aluminoxane or porous polymeric materials, onto which catalyst components are loaded. These support materials are generally used in amounts of at least 50 wt.-%, more preferably of at least 70.0 wt.-% based on the weight of the catalyst as a whole. Particle sizes are of the order of at least five micrometres. The solid particulate stabilizer is too small and is used in such low amounts that it cannot possibly act as a support.

Throughout the invention the terms "external catalytically inert support material" and "carrier material" are interchangeable.

Finally, the invention relates to the use of the catalyst of the invention in olefin polymerization.

DETAILED DESCRIPTION OF INVENTION

The present invention relates to a process for preparing a solid olefin polymerisation catalyst component or a solid olefin polymerization catalyst. The term catalyst component is used herein to refer to the components that make up a final catalyst such as a cocatalyst or a solid carrier for such components. Thus, it may be for example an $MgCl_2$ based carrier, a modified alkylaluminoxane carrier or an inert carrier such as silica or alumina. If the catalyst component is a carrier, then its particle size is preferably at least 4 μm. In addition to the catalyst components as listed above the catalysts comprise active catalytic compounds, like an organometallic compound.

Preferred catalyst components, however, are the organometallic compound (C) or aluminoxane (A) as herein described.

It is preferred therefore if the solid catalyst component or solid catalyst is prepared without using external support material. In a preferred embodiment the processes of the invention avoid the use of perfluorinated surfactants and potentially avoid the use of fluorinated compounds completely. The resulting process is thus more environmentally friendly. Solid catalysts of the invention also have good activity.

The solid particles of the invention comprise at least one catalyst component, such as at least one organometallic compound (C). In order to form a catalyst, the solid particles of the invention should comprise an organometallic compound (C) and a cocatalyst.

In a preferred embodiment, the solid particles of the invention comprise a single site organometallic compound (C) and aluminoxane (A).

Single Site Catalyst

The organometallic compound (C) preferably comprises a transition metal (M) of group 3 to 10 of the Periodic Table (IUPAC 2007) or of an actinide or lanthanide.

The term "an organometallic compound (C)" in accordance with the present invention preferably includes any metallocene or non-metallocene compound of a transition metal which bears at least one organic (coordination) ligand and exhibits the catalytic activity alone or together with a cocatalyst. The transition metal compounds are well known in the art and the present invention covers compounds of metals from group 3 to 10, e.g. group 3 to 7, or 3 to 6, such as group 4 to 6 of the Periodic Table, (IUPAC 2007), as well as lanthanides or actinides.

In one embodiment the organometallic compound (C) has the following formula (I):

wherein
"M" is a transition metal (M) of group 3 to 10 of the Periodic Table (IUPAC 2007),
each "X" is independently a mono anionic ligand, such as a σ-ligand,
each "L" is independently an organic ligand which coordinates to the transition metal "M",
"R" is a bridging group linking said organic ligands (L),
"m" is 1, 2 or 3, preferably 2,
"n" is 0, 1 or 2, preferably 1,
"q" is 1, 2 or 3, preferably 2, and
m+q is equal to the valency of the transition metal (M).
"M" is preferably selected from the group consisting of zirconium (Zr), hafnium (Hf), or titanium (Ti), more preferably selected from the group consisting of zirconium (Zr) and hafnium (Hf).

In a more preferred definition, each organic ligand (L) is independently
(a) a substituted or unsubstituted cyclopentadienyl or a bi- or multicyclic derivative of a cyclopentadienyl which optionally bear further substituents and/or one or more hetero ring atoms from a group 13 to 16 of the Periodic Table (IUPAC 2007); or
(b) an acyclic $\eta^1$- to $\eta^4$- or $\eta^6$-ligand composed of atoms from groups 13 to 16 of the Periodic Table, and in which the open chain ligand may be fused with one or two, preferably two, aromatic or non-aromatic rings and/or bear further substituents; or
(c) a cyclic $\eta^1$- to $\eta^4$- or $\eta^6$-, mono-, bi- or multidentate ligand composed of unsubstituted or substituted mono-, bi- or multicyclic ring systems selected from aromatic or non-aromatic or partially saturated ring systems, such ring systems containing optionally one or more heteroatoms selected from groups 15 and 16 of the Periodic Table (IUPAC 2007).

Organometallic compounds (C), preferably used in the present invention, have at least one organic ligand (L) belonging to the group (a) above. Such organometallic compounds are called metallocenes.

More preferably at least one of the organic ligands (L) belonging to group (a), preferably both organic ligands (L), is (are) selected from the group consisting of cyclopentadienyl, indenyl, tetrahydroindenyl, fluorenyl, which can be independently substituted or unsubstituted. Further, in case said organic ligands (L) are substituted it is preferred that at least one organic ligand (L), preferably both organic ligands (L), comprise one or more substituents independently selected from $C_1$ to $C_{20}$ hydrocarbyl or silyl groups, which optionally contain one or more heteroatoms selected from groups 14 to 16 and/or are optionally substituted by halogen atom(s), The term $C_1$ to $C_{20}$ hydrocarbyl group, whenever used in the present application, includes $C_1$ to $C_{20}$ alkyl, $C_2$ to $C_{20}$ alkenyl, $C_2$ to $C_{20}$ alkynyl, $C_3$ to $C_{20}$ cycloalkyl, $C_3$ to $C_{20}$ cycloalkenyl, $C_6$ to $C_{20}$ aryl, $C_7$ to $C_{20}$ alkylaryl or $C_7$ to $C_{20}$ arylalkyl groups or mixtures of these groups such as cycloalkyl substituted by alkyl.

Further, two substituents, which can be same or different, attached to adjacent C-atoms of a ring of the ligands (L) can also taken together form a further mono or multicyclic ring fused to the ring.

Preferred hydrocarbyl groups are independently selected from linear or branched $C_1$ to $C_{10}$ alkyl groups, optionally interrupted by one or more heteroatoms of groups 14 to 16, like O, N or S, and substituted or unsubstituted $C_6$ to $C_{20}$ aryl groups.

Linear or branched $C_1$ to $C_{10}$ alkyl groups, optionally interrupted by one or more heteroatoms of groups 14 to 16, are more preferably selected from methyl, ethyl, propyl, isopropyl, tertbutyl, isobutyl, $C_{5-6}$ cycloalkyl, OR, SR, where R is $C_1$ to $C_{10}$ alkyl group, $C_6$ to $C_{20}$ aryl groups are more preferably phenyl groups, optionally substituted with 1 or 2 $C_1$ to $C_{10}$ alkyl groups as defined above.

By "σ-ligand" is meant throughout the invention a group bonded to the transition metal (M) via a sigma bond.

Further, the ligands "X" are preferably independently selected from the group consisting of hydrogen, halogen, $C_1$ to $C_{20}$ alkyl, $C_1$ to $C_{20}$ alkoxy, $C_2$ to $C_{20}$ alkenyl, $C_2$ to $C_{20}$ alkynyl, $C_3$ to $C_{12}$ cycloalkyl, $C_6$ to $C_{20}$ aryl, $C_6$ to $C_{20}$ aryloxy, $C_7$ to $C_{20}$ arylalkyl, $C_7$ to $C_{20}$ arylalkenyl, —SR", —PR"$_3$, —SiR"$_3$, —OSiR"$_3$ and —NR"$_2$, wherein each R" is independently hydrogen, $C_1$ to $C_{20}$ alkyl, $C_2$ to $C_{20}$ alkenyl, $C_2$ to $C_{20}$ alkynyl, $C_3$ to $C_{12}$ cycloalkyl or $C_6$ to $C_{20}$ aryl.

More preferably "X" ligands are selected from halogen, $C_1$ to $C_6$ alkyl, $C_5$ to $C_6$ cycloalkyl, $C_1$ to $C_6$ alkoxy, phenyl and benzyl groups.

The bridging group "R" may be a divalent bridge, preferably selected from —R'$_2$C—, —R'$_2$C—CR'$_2$—, —R'$_2$Si—, —R'$_2$Si—Si R'$_2$—, —R'$_2$Ge—, wherein each R' is independently a hydrogen atom, $C_1$ to $C_{20}$ alkyl, $C_2$ to $C_{10}$ cycloalkyl, tri($C_1$ to $C_{20}$ alkyl)silyl, $C_6$ to $C_{20}$ aryl, $C_7$ to $C_{20}$ arylalkyl and $C_7$ to $C_{20}$ to alkylaryl.

More preferably the bridging group "R" is a divalent bridge selected from —R'$_2$C—, —R'$_2$Si—, wherein each R' is independently a hydrogen atom, $C_1$ to $C_{20}$ alkyl, $C_2$ to $C_{10}$ cycloalkyl, $C_6$ to $C_{20}$ aryl, $C_7$ to $C_{20}$ arylalkyl and $C_7$ to $C_{20}$ alkylaryl.

Another subgroup of the organometallic compounds (C) of formula (I) is known as non-metallocenes wherein the transition metal (M), preferably a Group 4 to 6 transition metal, suitably Ti, Zr or Hf, has a coordination ligand other than a cyclopentadienyl ligand.

The term "non-metallocene" used herein means compounds, which bear no cyclopentadienyl ligands or fused derivatives thereof, but one or more non-cyclopentadienyl η-, or σ-, mono-, bi- or multidentate ligand. Such ligands can be chosen e.g. from the groups (b) and (c) as defined above and described e.g. in WO 01/70395, WO 97/10248, WO 99/41290, and WO 99/10353), and further in V. C. Gibson et al., in Angew. Chem. Int. Ed., engl., vol 38, 1999, pp 428 447, the disclosures of which are incorporated herein by reference.

However, the organometallic compound (C) of the present invention is preferably a metallocene as defined above.

Metallocenes are described in numerous patents. In the following just a few examples are listed; EP 260 130, WO 97/28170, WO 98/46616, WO 98/49208, WO 98/040331, WO 99/12981, WO 99/19335, WO 98/56831, WO 00/34341, WO00/148034, EP 423 101, EP 537 130, WO2002/02576, WO2005/105863, WO 2006097497, WO2007/116034, WO2007/107448, WO2009/027075, WO2009/054832, WO 2012/001052 and EP 2532687, the disclosures of which are incorporated herein by reference. Further, metallocenes are described widely in academic and scientific articles.

Still in a more preferred embodiment the organometallic compound (C) used in the invention is of formula (II)

$(L)_2RMX_2$          (II)

wherein

"M" is zirconium (Zr) or hafnium (Hf), each "X" is independently selected from halogen, $C_1$ to $C_6$ alkyl, $C_5$ to $C_6$ cycloalkyl, $C_1$ to $C_6$ alkoxy, phenyl and benzyl groups, each "L" is independently a cyclopentadienyl, indenyl, tetrahydroindenyl, fluorenyl, which can be independently substituted or unsubstituted, preferably at least one organic ligand (L), preferably both organic ligands (L), comprise one or more substituents independently selected from $C_1$ to $C_{20}$ hydrocarbyl or silyl groups, which optionally contain one or more heteroatoms selected from groups 14 to 16 (IUPAC 2007) and/or are optionally substituted by halogen atom(s), "R" is a divalent bridge selected from —R'$_2$C—, —R'$_2$Si—, wherein each R' is independently a hydrogen atom, $C_1$ to $C_{20}$ alkyl, $C_2$ to $C_{10}$ cycloalkyl, $C_6$ to $C_{20}$ aryl, $C_7$ to $C_{20}$ arylalkyl or $C_7$ to $C_{20}$ alkylaryl.

The literature contains a wide disclosure of these type of catalysts. It will be appreciated that the invention herein relates to the method for preparing solid catalysts and not to the nature of the organometallic compound (C) actually present. The invention is therefore applicable to other known metallocene type complexes.

Aluminoxane

In order to produce a catalyst, the organometallic component (C) needs to be combined with a cocatalyst. Cocatalysts of use with single site complexes are well known in the art and include various boron compounds such as borates. It is preferred however if an aluminoxane compound is used.

The aluminoxane (A) can be any conventional aluminoxane as is known in the art. Aluminoxanes are commercially available or can be prepared according to prior art literature for example by the hydrolysis of aluminium alkyls either by direct water addition or by treatment with salt hydrates. There are a variety of methods for preparing aluminoxane and modified aluminoxanes, non-limiting examples of which are described in U.S. Pat. Nos. 4,665, 208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, EP-A-0 561 476, EP-B1-0 279 586, EP-A-0 594-218, and WO 94/10180, all of which are herein fully incorporated by reference.

Aluminoxanes are also called alumoxanes.

Preferably, $C_1$ to $C_{10}$-alkylalumoxanes, particularly methylalumoxane or modified methylalumoxane, isobutylalumoxane, e.g. TIBAO (tetraisobutylalumoxane) or HIBAO (hexaisobutylalumoxane) are used. More preferably the aluminoxane (A) is methylalumoxane (MAO). MAO is commercially available as 5 to 40 wt % solution in toluene.

The amount of aluminoxane used is within the skills of an expert in the field. As an example, the amount of Al, provided by aluminoxane, can be chosen to provide an Al: transition metal molar ratio e.g. in the range of 10:1 to 500:1, such as 100:1 to 300:1.

Solid Particulate Stabiliser

The solid particulate stabilizers are solid particles of inorganic or organic origin. They fulfill the partial wetting condition for most common oils. Examples include calcium carbonate and barium sulfate, clays (montmorillonite and laponite), carbon black, latex, magnetic particles, carbon nanotubes and block copolymer micelles. Particles such as catanionic nanocrystals, spores or bacteria can also provide efficient stabilization of Pickering emulsions. The solid particulate stabilizer is a solid in the emulsion.

The solid particulate stabiliser is preferably a nanoparticulate material. In one embodiment the solid stabilizer will be based on a particle population with a diameter of less than 1000 nm, such as less than 500 nm. Individual particles of the particle population preferably have a diameter of less than 100 nm.

Solid particulate stabilisers of the submicron size i.e. diam=0.1-1 micron, include latex and fumed silica.

In a most preferred embodiment, the solid particulate stabiliser is based on fumed pyrogenic silica particles characterized by a primary particle within 1-100 nm. Some of the particles within this population may undergo aggregation. Particle aggregates might be of the order of 100-500 nm in size. Particle agglomerates can be expected to be in the 500-1000 nm range.

Particle sizes can be determined using conventional techniques, such as using electron microscopy. Alternatively, laser diffraction according to EN d 481, ISO 9276-2 may be used. Particles of appropriate size are commercially available.

For the avoidance of doubt, the solid particulate stabiliser may be based on a nanosilica but that silica may comprise agglomerates and aggregates of primary particles.

Some inorganic particles are too hydrophilic at their surface to act as successful solid particulate emulsion stabilisers and require a partial hydrophobic coating in order to ensure the partial wetting. Silica is preferably treated in this way. Surface modification of the solid particulate stabiliser can make it more hydrophobic in order to meet condition of partial wetting. There are several strategies to do so based on either chemical grafting of organic molecules or adsorption of different types of (macro)molecules. Chemical grafting might be preferred over adsorption because the organic grafts are tightly attached to the solid surface by means of chemical bonds, whereas adsorbed molecules in equilibrium with free molecules and bulk phase may undergo desorption when the equilibrium conditions are shifted (upon dilution, addition of oil, change of pH or ionic strength).

Hydrophobized Nanosilicas

In one embodiment, the invention requires the use of a hydrophobized nanosilica or hydrophobic silica nanoparticles. Hydrophobic silica has hydrophobic groups chemically bonded to the surface. These are typically prepared by chemical modification (coating). The hydrophobic groups are normally alkyl or polydimethylsiloxane chains, such as DCMDS (dichlorodimethylsilane) and can contain varied percentage of residual silanol groups. Preferably, hydrophobic silicas contain below 50% of the residual silanol groups and are available commercially (e.g. HDK grades from Wacker).

Hydrophobic silica can be processed in different ways. It may derive from fumed silica, precipitated silica or aerosol assisted self-assembly, all existing in the form of nanoparticles.

The silica used in the present invention is typically a synthetic, hydrophobic, amorphous silica, produced via flame hydrolysis.

The silica itself is a powder. It may have a surface area of 90 to 250 $m^2/g$, such as 100 to 240 $m^2/g$, measured by BET.

It may have a tampered density of 30 to 90 g/L.

The residual silanol content is typically less than 60%, such as 10 to 55%. The carbon content is typically less than 7.0 wt %, such as 0.5 to 6.0 wt %.

Preferably the hydrophobized nanosilicas used in the invention have a surface area of 130 to 240 $m^2/g$, measured by BET, tampered density of 40 to 60 g/L, the residual silanol content in the range of 20 to 55% and the carbon content in the range of 1.5 to 6.0 wt %.

Preferred silicas include those with an area BET of 110-140 m2/g, a tampered density of 50-85 g/l, residual silanol of about 50% and a Carbon content of 0.6-2.2 wt %.

Preferred silicas include those with an area BET of 170-230 m2/g, a tampered density of about 50 g/l, residual silanol of about 25% and a Carbon content of 4-5.2 wt %.

Preferred silicas include those with an area BET of 170-230 m2/g, a tampered density of about 40 g/l, residual silanol of about 50% and a carbon content of 1-1.8 wt %.

Silicas meeting the requirements of claim 1 are commercial available from suppliers such as Wacker, e.g. under the trade name HDK H18 having a surface area of 170 to 230 $m^2/g$, measured by BET, tampered density of 50 g/L, the residual silanol content 25%, the carbon content in the range of 4.0 to 5.2 wt % and a primary particle size in the range of 5 to 50 nm.

In any process of the invention, the amount of solid particulate stabilsier, such as hydrophobised nanosilica, added relative to the amount of aluminoxane is preferably less than 10 wt % such as 0.5 to 8.0 wt %, preferably 1.0 to 5.0 wt % (solids basis).

It will be appreciated that on solidification of the catalyst or catalyst component(s) from the emulsion, the catalyst will contain small amounts of the solid particulate stabiliser. Catalysts of the invention may comprise between 0.1 and 4.0 wt % solid particulate stabiliser, such as 0.25 to 2.0 wt %, especially 0.5 to 1.5 wt % solid particulate stabiliser.

Each process will now be described. In a first embodiment, a solid particulate stabilizer is used to stabilize emulsions prepared following techniques disclosed in WO03/051934 thus avoiding the need for a fluorinated surfactant. The process again is based on the preparation of a liquid liquid emulsion.

Embodiment 1

Liquid Liquid Emulsion Manufacture

In order to provide the catalyst of the invention in solid form but without using an external carrier, a liquid-liquid emulsion system is prepared from which the catalyst particles are solidified. The process involves dispersing at least one catalyst component, such as an organometallic compound (C), and optionally an aluminoxane (A), and in a first organic liquid (also known as the first organic solvent herein), forming a liquid liquid emulsion through the addition of an optionally halogenated hydrocarbon liquid immiscible therewith (also known as an optionally halogenated hydrocarbon solvent or immiscible solvent) in the presence of solid particulate stabilizer, preferably hydrophobized nanosilica. With suitable mixing, this process forms dispersed droplets of the first organic liquid containing the at least one olefin polymerisation catalyst component in the immiscible liquid (i.e. the optionally halogenated hydrocarbon). Solid particles are obtained by solidifying said dispersed droplets.

More preferably, the process involves dispersing organometallic compound (C), and aluminoxane (A) in a first organic solvent, forming a liquid liquid emulsion through the addition of an optionally halogenated hydrocarbon liquid immiscible therewith in the presence of solid particulate stabilizer, preferably hydrophobized nanosilica to form dispersed droplets of the catalyst and solidifying said dispersed droplets to form solid particles.

In particular, the method involves preparing a solution of the components (C) and (A) including the solid particulate stabilizer; dispersing said solution in an optionally halogenated hydrocarbon immiscible therewith to form an emulsion in which said catalyst components are present in the droplets of the dispersed phase; immobilising the catalyst components in the dispersed droplets, in the absence of an external particulate porous support, to form solid particles comprising the said catalyst, and optionally recovering said particles.

This process enables the manufacture of active catalyst particles with improved morphology, e.g. with a predetermined spherical shape and particle size and without using any added external porous support material, such as an inorganic oxide. Also desirable surface properties can be obtained.

The catalyst components can derived from one solution which is dispersed into the immiscible solvent (also known as the immiscible liquid herein), or, alternatively, at least two separate catalyst solutions for each part of the catalyst forming compounds may be prepared, which are then dispersed successively or simultaneously to the solvent. The solid particulate stabiliser can form part of any such solution.

In a preferred method for forming the catalyst a solution of the organometallic compound (C) and the aluminoxane is combined with a slurry of solid particulate stabiliser, e.g. hydrophobized nanosilica and aluminoxane. When combined with the solvent immiscible therewith, this forms an oil-in-oil emulsion wherein the immiscible solvent forms the continuous liquid phase and the catalyst components form the dispersed phase (discontinuous phase) in the form of dispersed droplets. The solid particulate stabiliser stabilizes the emulsion.

The droplets are then solidified to form solid catalyst particles, and the solid particles are separated from the liquid and optionally washed and/or dried. The solvent forming the continuous phase may be immiscible to the catalyst solution at least at the conditions (e.g. temperatures) used during the dispersing step.

The term "immiscible with the catalyst solution" means that the solvent (continuous phase) is fully immiscible or partly immiscible i.e. not fully miscible with the dispersed phase solution.

Preferably said immiscible solvent is inert in relation to the compounds of the catalyst system to be produced. Full disclosure of the necessary process can be found in WO03/051934 which is herein incorporated by reference.

The inert solvent must be chemically inert at least at the conditions (e.g. temperature) used during the dispersing step. Preferably, the solvent of said continuous phase does not contain dissolved therein any significant amounts of catalyst forming compounds. Thus, the solid particles of the catalyst are formed in the droplets from the compounds which originate from the dispersed phase (i.e. are provided to the emulsion in a solution dispersed into the continuous phase).

The terms "immobilisation" and "solidification" are used herein interchangeably for the same purpose, i.e. for forming free flowing solid catalyst particles in the absence of an external porous particulate carrier, such as silica. The solidification happens thus within the droplets. Said step can be effected in various ways as disclosed in said WO03/051934. Preferably, solidification is caused by an external stimulus to the emulsion system such as a temperature change to cause the solidification. Thus in said step the catalyst component (s) remain "fixed" within the formed solid particles. It is also possible that one or more of the catalyst components may take part in the solidification/immobilisation reaction.

Accordingly, solid, compositionally uniform particles having a predetermined particle size range can be obtained.

Furthermore, the particle size of the catalyst particles of the invention can be controlled by the size of the droplets in the solution, and spherical particles with a uniform particle size distribution can be obtained.

The invention is also industrially advantageous, since it enables the preparation of the solid particles to be carried out as a one-pot procedure. Continuous or semicontinuous processes are also possible for producing the catalyst.

Dispersed Phase

The principles for preparing two phase emulsion systems are known in the chemical field. Thus, in order to form the two phase liquid system, the solution of the catalyst component (s) and the solvent used as the continuous liquid phase have to be essentially immiscible at least during the dispersing step. This can be achieved in a known manner e.g. by choosing said two liquids and/or the temperature of the dispersing step/solidifying step accordingly.

A first organic solvent may be employed to form the solution of the catalyst component (s). Said solvent is chosen so that it dissolves said catalyst component (s). The solvent is an organic solvent such as used in the field, comprising an optionally substituted hydrocarbon such as linear or branched aliphatic, alicyclic or aromatic hydrocarbon, such as a linear or cyclic alkane, an aromatic hydrocarbon and/or a halogen containing hydrocarbon.

Examples of aromatic hydrocarbons are toluene, benzene, ethylbenzene, propylbenzene, butylbenzene and xylene. Toluene is a preferred solvent. The solution may comprise one or more solvents. Such a solvent can thus be used to facilitate the emulsion formation, and usually does not form part of the solidified particles, but e.g. is removed after the solidification step together with the continuous phase.

Alternatively, a solvent may take part in the solidification, e.g. an inert hydrocarbon having a high melting point (waxes), such as above 40° C., suitably above 70° C., e.g. above 80° C. or 90° C., may be used as solvents of the dispersed phase to immobilise the catalyst compounds within the formed droplets.

In another embodiment, the solvent consists partly or completely of a liquid monomer, e.g. liquid olefin monomer designed to be polymerised in a "prepolymerisation" immobilisation step.

Continuous Phase

The solvent/liquid used to form the continuous liquid phase is a single solvent or a mixture of different solvents and may be immiscible with the solution of the catalyst components at least at the conditions (e.g. temperatures) used during the dispersing step. Preferably said solvent is inert in relation to said compounds.

The term "inert in relation to said compounds" means herein that the solvent of the continuous phase is chemically inert, i.e. undergoes no chemical reaction with any catalyst forming component. Thus, the solid particles of the catalyst are formed in the droplets from the compounds which originate from the dispersed phase, i.e. are provided to the emulsion in a solution dispersed into the continuous phase.

It is preferred that the catalyst components used for forming the solid catalyst will not be soluble in the solvent of the continuous liquid phase. Preferably, said catalyst components are essentially insoluble in said continuous phase forming solvent.

Solidification takes place essentially after the droplets are formed, i.e. the solidification is effected within the droplets e.g. by causing a solidifying reaction among the compounds present in the droplets. Furthermore, even if some solidifying agent is added to the system separately, it reacts within the droplet phase and no catalyst forming components go into the continuous phase.

The term "emulsion" used herein covers both bi- and multiphasic systems.

The solvent forming the continuous phase is an inert solvent which is an optionally halogenated hydrocarbon solvent or mixtures thereof, preferably fluorinated hydrocarbon solvents and particularly semi, highly or perfluorinated hydrocarbon solvents. Examples of the above-mentioned solvents are semi, highly or perfluorinated hydrocarbons, such as alkanes, alkenes and cycloalkanes, ethers, e.g. perfluorinated ethers and amines, particularly tertiary amines, and functionalised derivatives thereof. Preferred are semi, highly or perfluorinated, particularly perfluorinated hydrocarbons, e.g. perfluorohydrocarbons of e.g. C3-C30, such as C4-C10. Specific examples of suitable perfluoroalkanes and perfluorocycloalkanes include perfluoro-hexane, -heptane, -octane and -(methylcyclohexane). Semi fluorinated hydrocarbons relates particularly to semi-fluorinated n-alkanes, such as perfluoroalkyl-alkane.

"Semi fluorinated" hydrocarbons also include such hydrocarbons wherein blocks of —C—F and —C—H alternate. "Highly fluorinated" means that the majority of the —C—H units are replaced with —C—F units. "Perfluorinated" means that all —C—H units are replaced with —C—F units. See the articles of A. Enders and G. Maas in "Chemie in unserer Zeit", 34. Jahrg. 2000, Nr. 6, and of Pierandrea Lo Nostro in "Advances in Colloid and Interface Science", 56 (1995) 245-287, Elsevier Science.

Hexadecafluoro-1,3-dimethylcyclohexane is a most preferred option.

Dispersing Step

The emulsion can be formed by any means known in the art: by mixing, such as by stirring said solution of catalyst components vigorously to said solvent forming the continuous phase or by means of mixing mills, or by means of ultra-sonic wave, or by using a so called phase change method for preparing the emulsion by first forming a homogeneous system which is then transferred by changing the temperature of the system to a biphasic system so that droplets will be formed.

The solid particulate stabiliser is present during the dispersing step and may be added via the dispersed phase components, the continuous phase components or separately. The solid particulate stabiliser stabilises the forming emulsion and hence the route by which it is caused to be present is flexible.

The two phase state is maintained during the emulsion formation step and the solidification step, as, for example, by appropriate stirring.

The solid particulate stabiliser acts as an emulsion stabiliser for facilitating the formation and/or stability of the emulsion. In essence therefore, it acts as a kind of surfactant.

Preferably, the solid particulate stabiliser can be added to the catalyst solution, which forms the dispersed phase of the emulsion, to facilitate the forming of the emulsion and to stabilize the emulsion. Alternatively, it might be added to the solvent which forms the continuous phase. In a preferred embodiment, the hydrophobized nanosilica is combined with aluminoxane in an aromatic solvent such as toluene to form a surfactant solution. This can be combined with the homogeneous catalyst solution and then combined with the immiscible solvent to form the emulsion of the invention. The solid particulate stabiliser stabilises the interface between the continuous and discontinuous phase, i.e. it acts as a Pickering emulsion stabiliser.

Solidification

The solidification of the catalyst component(s) in the dispersed droplets can be effected in various ways, e.g. by causing or accelerating the formation of said solid catalyst forming reaction products of the compounds present in the droplets. This can be effected, depending on the used compounds and/or the desired solidification rate, with or without an external stimulus, such as a temperature change of the system.

In a particularly preferred embodiment, the solidification is effected after the emulsion system is formed by subjecting the system to an external stimulus, such as a temperature change. Temperature differences are of e.g. 5 to 100° C., such as 10 to 100° C., or 20 to 90° C., such as 50 to 90° C.

The emulsion system may be subjected to a rapid temperature change to cause a fast solidification in the dispersed system. The dispersed phase may e.g. be subjected to an immediate (within milliseconds to few seconds) temperature change in order to achieve an instant solidification of the component (s) within the droplets. The appropriate temperature change, i.e. an increase or a decrease in the temperature of an emulsion system, required for the desired solidification rate of the components cannot be limited to any specific range, but naturally depends on the emulsion system, i.a. on the used compounds and the concentrations/ratios thereof, as well as on the used solvents, and is chosen accordingly. It is also evident that any techniques may be used to provide sufficient heating or cooling effect to the dispersed system to cause the desired solidification.

In one embodiment the heating or cooling effect is obtained by bringing the emulsion system with a certain temperature to an inert receiving medium with significantly different temperature, e.g. as stated above, whereby said temperature change of the emulsion system is sufficient to cause the rapid solidification of the droplets. The receiving medium can be gaseous, e.g. air, or a liquid, preferably a solvent, or a mixture of two or more solvents, wherein the catalyst component (s) is (are) immiscible and which is inert in relation to the catalyst component (s). For instance, the receiving medium comprises the same immiscible solvent used as the continuous phase in the first emulsion formation step.

Said solvents can be used alone or as a mixture with other solvents, such as aliphatic or aromatic hydrocarbons, such as alkanes. Preferably a fluorinated solvent as the receiving medium is used, which may be the same as the continuous phase in the emulsion formation, e.g. perfluorinated hydrocarbon.

Alternatively, the temperature difference may be effected by gradual heating of the emulsion system, e.g. up to 10° C. per minute, preferably 0.5 to 6° C. per minute and more preferably in 1 to 5° C. per minute.

In case a melt of e.g. a hydrocarbon solvent is used for forming the dispersed phase, the solidification of the droplets may be effected by cooling the system using the temperature difference stated above.

Preferably, the "one phase" change as usable for forming an emulsion can also be utilised for solidifying the catalytically active contents within the droplets of an emulsion system by, again, effecting a temperature change in the dispersed system, whereby the solvent used in the droplets becomes miscible with the continuous phase, preferably a fluorous hydrocarbon continuous phase as defined above, so that the droplets become impoverished of the solvent and the solidifying components remaining in the "droplets" start to solidify. Thus the immiscibility can be adjusted with respect to the solvents and conditions (temperature) to control the solidification step.

The miscibility of e.g. organic solvents with fluorous hydrocarbon solvents can be found from the literature and be chosen accordingly by a skilled person. Also the critical temperatures needed for the phase change are available from the literature or can be determined using methods known in the art, e.g. the Hildebrand-Scatchard-Theorie. Reference is also made to the articles of A. Enders and G. and of Pierandrea Lo Nostro cited above.

Thus according to the invention, the entire or only part of the droplet may be converted to a solid form. The size of the "solidified" droplet may be smaller or greater than that of the original droplet, e.g. if the amount of the monomer used for the prepolymerisation is relatively large.

The solid catalyst particles (CS) recovered can be used, after an optional washing step, in a polymerisation process of an olefin. Alternatively, the separated and optionally washed solid particles can be dried to remove any solvent present in the particles before use in the polymerisation step. The separation and optional washing steps can be effected in a known manner, e.g. by filtration and subsequent washing of the solids with a suitable solvent.

The droplet shape of the particles may be substantially maintained. The formed particles may have a mean size range of 1 to 500 µm, e.g. 5 to 500 µm, advantageously 5 to 200 µm or 10 to 150 µm. Even a mean size range of 5 to 60 µm is possible. The size may be chosen depending on the polymerisation the catalyst is used for. Advantageously, the mean particle size of the ready particulate catalysts of the invention are in the range of 2 to 150 µm, preferably 5 to 120 µm, more preferably 5 to 90 µm and especially in the range 10 to 70 µm. The particles are essentially spherical in shape, they have a low porosity and a low surface area.

The formation of solution can be effected at a temperature of 0-100° C., e.g. at 20-80° C. The dispersion step may be effected at −20° C.-100° C., e.g. at about −10-70° C., such as at −5 to 30° C., e.g. around 0° C.

The solidification of the catalyst component in the droplets is preferably effected by raising the temperature of the mixture, e.g. from 0° C. temperature up to 100° C., e.g. up to 60-90° C., gradually. E.g. in 1 to 180 minutes, e.g. 1-90 or 5-30 minutes, or as a rapid heat change. Heating time is dependent on the size of the reactor.

During the solidification step, which is preferably carried out at about 60 to 100° C., preferably at about 75 to 95° C., (below the boiling point of the solvents) the solvents may preferably be removed and optionally the solids are washed with a wash solution, which can be any solvent or mixture of solvents such as those defined above and/or used in the art, preferably a hydrocarbon, such as pentane, hexane or heptane, suitably heptane. The washed catalyst can be dried or it can be slurried into an oil and used as a catalyst-oil slurry in polymerisation process.

All or part of the preparation steps can be done in a continuous manner. Reference is made to WO2006/069733 describing principles of such a continuous or semicontinuous preparation methods of the solid catalyst types, prepared via emulsion/solidification method.

Embodiment 2

In one preferred embodiment, the process avoids the use of fluorinated surfactants and solvents. The invention is directed at a process for the preparation of a solid catalyst system (CS) comprising the steps of
(i) preparing a liquid clathrate (LC) comprising a mixing step of an aluminoxane (A), an aromatic compound (AC) and a polarity modifier compound (PM), preferably wherein the mol-ratio between the organo-silicon compound (OS) and aluminum (Al) of the aluminoxane (A) [(OS)/(Al)] is preferably below 0.1,
(ii) mixing said liquid clathrate (LC) with an organometallic compound (C) to obtain a liquid mixture (MI), wherein said organometallic compound (C) is of formula (I) as hereinbefore defined;
(iii) contacting the liquid mixture (MI) with a solvent immiscible with the liquid mixture in the presence of a solid particulate stabiliser to form an emulsion; (iv) precipitating the solid catalyst system (CS) by adding a saturated aliphatic compound to said emulsion;
(v) optionally recovering particles to obtain the solid catalyst system (CS).

According to the invention first step (step (i)) is followed by the second step (step (ii)) and so on. In other words, a liquid mixture (MI) is produced by preparing a liquid clathrate (LC) and subsequently mixing said liquid clathrate (LC) with an organometallic compound (C). Accordingly the liquid clathrate (LC) is not treated any further before being mixed with an organometallic compound (C). Further it is preferred that the liquid clathrate (LC) is a solution according to the definition of this invention. By "not treated" is meant that no such actions are carried out, which might change either the physical or chemical composition of the liquid clathrate (LC) of step (i). However, e.g. washing or storing, where no such changes happen is possible between the steps (i) and (ii), if needed.

The liquid mixture (MI) can be stored before further use.

Further it is preferred that the liquid mixture (MI) itself is homogenous, i.e. is a solution according to the definition of the invention.

According to the invention step (iii) is followed by step (iv). In other words, in step (iii) an emulsion is produced and said catalyst system (CS) is then precipitated. Accordingly the requirement that step (iv) must subsequently follow step (iii) may allow the storage of the emulsion, but does not encompass embodiments in which the emulsion is further treated in a way that any physical or chemical changes occur in the emulsion.

The term "mixture" throughout the present application indicates that two or more substances are present.

The term "solution" throughout the present application indicates that two or more substances are homogenously mixed, e.g. is not a two phase system.

An "emulsion" according to this invention is a liquid liquid emulsion prepared through a mixture of two liquid substances. One substance, the dispersed phase, is dispersed in the other substance, the continuous phase, as droplets. The emulsion is an oil-in-oil emulsion.

The term "liquid" according to this invention indicates that a compound (including a liquid) is liquid by normal pressure (1 atm) at room temperature, e.g. 20 to 30° C.

A "liquid clathrate" is according to this invention a liquid which comprises, preferably consists of, a lattice (L), i.e. the reaction product of aluminoxane (A), the organo-silicon compound (OS) and a guest (G) enclosed therein. Liquid clathrates are as such well known and for instance described by Atwood, Jerry L. Dep. Chem., Univ. Alabama, Tuscaloosa, Ala., USA. Editor(s): Robinson, Gregory Heagward.; Coord. Chem. Alum. (1993), p. 197-32. Publisher: VCH, New York, N.Y. CODEN: 59ECAI Conference; General Review written in English. CAN 119:117290, John D. Holbrey, "Liquid clathrate formation in ionic liquid-aromatic mixtures", Chem. Commun., 2003, pages 476 to 477, and Scott K. Spear, Encyclopedia of Supramolecular Chemistry, 2001, pages 804 to 807.

Accordingly the "liquid clathrate (LC)" is preferably a liquid in which the lattice (L) constitutes the superstructure wherein the guest (G) is embedded. Preferably the guest (G) stabilizes said superstructure. The guest (G) according to this invention is the aromatic compound (AC).

A benefit of the solid catalyst system (CS) of the present invention over the metallocene/MAO based catalysts of prior art is the low solubility in solvents, including solvents used in polymerisation. The liquid clathrate (LC) is more stable than traditional catalyst/co-catalyst structures and thus is less soluble in common media for olefin polymerisation.

Step (i)

The liquid clathrate (LC) of the present invention comprises:
(a) a lattice (L) being the reaction product of
(a1) aluminoxane (A) and
(a2) an organo-silicon compound (OS) being effective to form with the aluminoxane (A) the lattice (L).

The lattice (L) is formed in presence of an aromatic compound (AC).

As stated above for the formation of the lattice (L) of the liquid clathrate (LC) an organo-silicon compound (OS) is necessary which reacts with the aluminoxane (A). The lattice is formed by reacting a polarity modifier such as an organo-silicon compound (OS) with aluminoxane (A) in presence of an aromatic compound (AC).

The Polarity Modifier (PM)

In general, the polarity modifier is a compound that is able to coordinate to the cocatalyst to reduce the viscosity of the system. In particular therefore, the polarity modifier is a compound which is able to modify the polarity of the aluminoxane. It may therefore be a multidentate ligand such as a bidentate ligand.

Suitable modifiers include diesters, diethers, diamines, polyethers, polyesters, or polyamines. A most preferred polarity modifier is however an organo-silicon compound.

It is preferred that the organo-silicon compound (OS) doesn't comprise halogens, in particular doesn't comprise fluorine.

The preferred organo-silicon compound (OS) which is effective to form the lattice (L) with the aluminoxane (A) can be selected from the group of hydrocarbyloxysilanes of the formula:

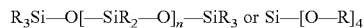

$R_3Si-O[-SiR_2-O]_n-SiR_3$ or $Si-[O-R]_4$ wherein each R is, independently, a hydrocarbyl group having up to 20 carbon atoms (e.g. linear or branched alkyl, cycloalkyl, aryl, aralkyl, alkylaryl); and
n is 0 to 3; and
hydrocarbylpolysiloxanes having from 2 to 8 silicon atoms in the molecule and which are separated from each other by an oxygen atom such that there is a linear, branched or cyclic backbone of alternating Si and oxygen atoms, with the remainder of the four valence bonds of each of the silicon atoms individually satisfied by an univalent hydrocarbyl group, R, as just defined.

Preferably the hydrocarbyl groups, R, are methyl, ethyl and phenyl. Examples of such organo-silicon compounds (OS) include tetra-methoxysilane, tetraethoxysilane, tetra-phenoxysilane, methoxytrimethylsilane, ethoxytrimethylsilane, hexamethyldisiloxane, hexaethyldisiloxane, hexaphenyldisiloxane, tetramethyldiphenyldisiloxane, dimethyltetraphenyldisiloxane, hexamethylcyclotrisiloxane, octamethylcyclotetrasiloxane, octaphenylcyclotetrasiloxane, octamethyltrisiloxane, decamethyltetrasiloxane, dodecamethylpentasiloxane and tetradecamethylhexasiloxane, 1,3,3,5-tetramethyl-1,1,5,5-tetraphenyltrisiloxane, 1,1,1,5,5,5-hexamethyl3,3-diphenyltrisiloxane, and 1,1,1,3,5,5,5-heptamethyl-3-phenyltrisiloxane.

Preferably the organo-silicon compound (OS) is selected from the group consisting of octamethyltrisiloxane, decamethyltetrasiloxane, octamethylcyclotetrasiloxane, methoxytrimethylsilane, tetraethoxysilane and 1,1,1,3,5,5,5-heptamethyl-3-phenyltrisiloxane. Preferably the organo-silicon compound (OS) is octamethyltrisiloxane.

The aluminoxane (A) is defined above. More preferably the aluminoxane (A) is methylalumoxane (MAO). MAO is commercially available as 5 to 40 wt % solution in toluene which is convenient as toluene can act as aromatic compound (AC).

Preferably the mol ratio between the polarity modifier such as organo-silicon compound (OS) and aluminum (Al) of the aluminoxane (A) [(PM/(Al)] is equal or below 0.1, preferably in the range of 0.02 to 0.08, more preferably 0.02 to 0.07, most preferably 0.03 to 0.06, like 0.03 to 0.05. The mol-ratio is determined from the compounds provided in step (i) and relates to the starting concentrations as provided in step (i) of the process described.

It is envisaged that catalytic activity may decrease at high concentrations of polarity modifier (PM), especially organo-silicon compounds (OS).

The aromatic compound (AC) can be any aromatic compound suitable as host for the reaction of the polarity modifier (PM) with aluminoxane (A) from which the lattice (L) of the liquid clathrate (LC) is formed. The aromatic compound (AC) is preferably a liquid. Accordingly it is appreciated that the aromatic compound (AC) is an aromatic hydrocarbon solvent, such as for example toluene, benzene, xylenes, ethylbenzene, cumene, mesitylene or cymene. More preferably the aromatic compound (AC) is toluene.

The liquid clathrate (LC) is obtainable by, preferably obtained by,
(I) providing a mixture of an organo-silicon compound (OS), aluminoxane (A) and an aromatic compound (AC)
(II) obtaining a two phase system comprising an aromatic compound (AC) rich phase, and a liquid clathrate (LC) rich phase,
(III) separating the aromatic compound (AC) rich phase from the liquid clathrate (LC) rich phase.

It is preferred that the process from which the liquid clathrate (LC) is obtainable comprises formation of two stable immiscible organic layers, which remain intact such that the aromatic compound (AC) rich phase can be separated from the liquid clathrate (LC) rich phase.

The reaction is performed preferably under stirring and under inert atmosphere of for example $N_2$ or Argon at temperatures between −20 to 70° C., preferably between −10 to 60° C., more preferably between 0 to 50° C., even more preferably between 10 to 40° C., for example 20 to 30° C. A person skilled in the art can easily determine experimentally a suitable temperature for any of the organo-silicon compound (OS).

Preferably aluminoxane (A) in an aromatic compound (AC) is added to the polarity modifier (PM). However, it is appreciated that also the polarity modifier (PM) could be added to aluminoxane (A) in an aromatic compound (AC). Furthermore, it is appreciated that also the polarity modifier (PM) could be provided as a solution in an aromatic compound (AC), in this case aluminoxane doesn't necessarily have to be provided in an aromatic compound (AC).

In an embodiment the aromatic compound (AC) rich phase constitutes the upper layer and the lower layer constitutes the liquid clathrate (LC) rich phase.

The upper phase is removed and the lower liquid clathrate (LC) rich phase, i.e. the liquid clathrate (LC) solution, is optionally washed before further use. The liquid clathrate (LC) phase, i.e. the liquid clathrate (LC), is preferably washed once or up to 5 times, preferably once to three times, with a (liquid) hydrocarbon compound, preferably with the aromatic compound (AC) used for its preparation, like toluene.

The starting concentration of aluminoxane (A) in the aromatic compound (AC), like toluene, usually ranges from 5 to 40 wt.-% solution.

Phase separation into the two phase system may occur immediately, i.e. by mixing polarity modifier (PM), aluminoxane (A) and the aromatic compound (AC), or may commence after a few hours, like 4 hours, or after one or more days, like after one to three days. Separation can be improved if the mixture is cooled down to −20° C., if needed. Most often the phase separation occurs immediately. E.g. by using 5 to 40 wt-% methylaluminoxane (MAO) solution in toluene separation occurs immediately. However, phase separation time is dependent on the used aromatic compound (AC) and aluminoxane (A) concentrations therein as well type and amount of polarity modifier (PM).

Accordingly the reaction is characterized by the formation of a two phase system comprising two stable immiscible organic layers, which remain intact such that the upper layer, preferably the aromatic compound (AC) rich phase, can be separated from the lower phase, preferably the liquid clathrate (LC) layer, i.e. the liquid clathrate (LC).

For further processing the liquid clathrate (LC) phase, i.e. the liquid clathrate (LC) solution, is separated from the upper solvent layer by conventional separation techniques, for example by decantation, siphoning or draining.

Optionally the separated liquid clathrate (LC) phase can be washed before further use. Preferably the liquid clathrate phase (LC) is washed once or up to 5 times, preferably once to three times, with the aromatic compound (AC) used for its preparation.

The liquid clathrate (LC) as such is used in step (ii) and not for instance the liquid clathrate (LC) together with the upper phase formed during the preparation of the liquid clathrate (LC), i.e. the liquid clathrate (LC) solution.

Step (ii)

In step (ii) the liquid clathrate (LC) is mixed with an organometallic compound (C) and a liquid mixture (MI) is obtained. Preferably, the solid particulate stabiliser can be added to this mixture in step (iii). Preferably the liquid mixture (MI) obtained is a solution. Solution, as defined earlier in this application, indicates that two or more substances are homogeneously mixed, e.g. it is not a two phase system.

The liquid clathrate (LC) is preferably reacted under stirring, with the organometallic compound (C), under inert atmosphere of for example $N_2$ or Argon at temperatures between −20 to 70° C., preferably between −10 to 60° C., more preferably between 0 to 50° C., even more preferably between 10 to 40° C., for example 20 to 30° C., to obtain the liquid mixture (MI) being a solution. A person skilled in the art can easily determine experimentally a suitable temperature for any liquid clathrate (LC) and the organometallic compound (C).

According to the present invention, it has been found that not only the mol-ratio of aluminum from the aluminoxane (A) to the polarity modifier (PM) has a strong influence on the catalytic activity of the catalyst system (CS) obtainable, but also the mol-ratio between aluminum of the aluminoxane (A) and transition metal (M) of the organometallic compound (C).

Accordingly it is preferred that the mol-ratio between aluminum (Al) of the aluminoxane (A) and transition metal (M) of the organometallic compound (C) [(Al)/(M)] is ≤600, more preferred ≤500, like below 450. Furthermore, it is preferred that the mol-ratio between aluminum (Al) of the aluminoxane (A) and transition metal (M) of the organometallic compound (C) [(Al)/(M)] is ≥50, more preferred ≥100, even more preferred ≥150. In other words it is preferred that the mol-ratio between aluminum (Al) of the aluminoxane (A) and transition metal (M) of the organometallic compound (C) [(Al)/(M)] is in a range from 50 to 600, preferably in a range from 100 to 500, like 150 to 450.

The mol-ratio is determined from the compounds provided in steps (i) and (ii) and relates to the starting concentrations as provided in steps (i) and (ii) of the process described.

Furthermore, it is preferred that the mol-ratio determined from the compounds provided in step (ii) is also present in the catalyst system (CS) obtained from the inventive process.

As is commonly known the catalytic activity of the catalyst system (CS) is normally higher with lower mol-ratio between aluminum (Al) of the aluminoxane (A) and transition metal (M) of the organometallic compound (C) [(Al)/(M)].

In the present invention it has been found that clathrating agent has a clear impact on catalyst activity.

Whilst the solid particulate stabiliser is preferably added in a step (iii) it is also envisaged that solid particulate stabiliser could be added to the LC along with the organometallic compound (C) or even before the organometallic compound (C). In this scenario, step (iii) involves the preparation of an emulsion by combining the liquid mixture with a solvent immiscible therewith so that the solvent forms the continuous phase and the liquid mixture forms the dispersed phase in the emulsion. The solid particulate stabiliser can act to stabilise the emulsion.

Step (iii)

In step (iii) an emulsion is formed in the presence of a solid particulate stabiliser. The solid particulate stabiliser can be added during step (iii) or it may be added at a convenient time in step (i) or step (ii). What is important is that when the emulsion is formed in step (iii), the solid particulate stabiliser is present.

Preferably, solid particulate stabiliser is contacted with the product of step (ii), i.e. the liquid mixture. This may occur in the actual emulsification vessel or precontact between the solid particulate stabiliser and liquid mixture can be effected. The solid particulate stabiliser can be added to the liquid mixture in the form of a slurry or added to the emulsification reactor in the form of a slurry.

The solid particulate stabiliser is typically added via a slurry in an aromatic solvent typically the same as that used in step (i). In one embodiment, a mixture of aromatic solvents can be used. In a preferred embodiment, one of said solvents is a halogenated aromatic solvent and the other is not. In general, the use of a more polar solvent, such as a halogenated solvent improves step (iii) by ensuring that the mixture is not too viscous. The more polar solvent acts as a polar diluent. A mixture of solvents can be used such as toluene and fluorobenzene.

In one embodiment, the liquid mixture is precontacted with the solid particulate stabiliser, e.g. in the form of a slurry. This mixture can be stirred over night. Alternatively, the solid particulate stabiliser can be placed in the emulsification vessel and contact can occur in the emulsification vessel.

The amount of solid particulate stabiliser added relative to the amount of aluminoxane is preferably less than 10 wt % such as 0.5 to 8.0 wt %, preferably 1.0 to 5.0 wt %.

In order to ensure that an emulsion forms, a solvent immiscible with the liquid mixture is required. Typically, the solvent used is an aromatic compound, such as toluene. Aromatic compounds (AC) as herein before defined are suitable here. The "clathrated" MAO compositions have limited liquid-liquid miscibility with normal hydrocarbons (e.g. toluene), therefore a liquid-liquid emulsion can be generated without a need to use fluorinated solvents.

The solid particulate stabiliser stabilises the forming emulsion. When too high amount of the solid particulate stabiliser particles is used, the resulting catalyst solution may became over viscous limiting the ability to prepare an emulsion in the emulsification reactor.

The emulsion that forms is a liquid liquid emulsion and contains a continuous phase based on the immiscible solvent and a dispersed phase comprising the liquid mixture. The solid particulate stabiliser stablises the interface between the continuous and dispersed phases. The emulsion can be stored if required.

Step (iv)

In step (iv) the solid catalyst system (CS) is precipitated by adding a saturated aliphatic compound to the emulsion obtained from step (iii).

The precipitation is performed preferably under stirring and under inert atmosphere of for example $N_2$ or Argon at temperatures between 10 and 40° C., preferably between 15 and 35° C. and more preferably between 20 and 30° C.

Although the use of ambient temperatures is most convenient, i.e. from 10 to 30° C., some compounds require elevated or lower temperatures. A person skilled in the art can easily determine experimentally a suitable temperature depending on the type of aromatic compound used in the process.

Accordingly in the instant process precipitation in step (iv) is accomplished by removing the aromatic compound (AC) from the liquid mixture of liquid clathrate (LC) and organometallic compound. The aromatic solvent is miscible with the saturated aliphatic solvent and is extracted by it.

According to the invention the precipitation in step (iv) is accomplished by adding a saturated aliphatic compound to the emulsion which causes a dilution effect for the aromatic compound (AC) in the liquid mixture leading to the precipitation of the catalyst system (CS).

Preferably the saturated aliphatic compound is selected from the group consisting of $C_1$ to $C_{20}$ alkanes, $C_4$ to $C_{12}$ cycloalkanes and combinations thereof, preferably $C_3$ to $C_{12}$ alkanes, like $C_5$ to $C_{10}$ alkanes. More preferably the aliphatic compound is selected from the group consisting of n-pentane, n-hexane, n-heptane, n-octane, and mixtures thereof. Even more preferably the aliphatic compound is n-pentane or n-heptane.

In a preferred embodiment the aromatic compound (AC) is toluene and/or the saturated aliphatic compound is selected from the group consisting of n-pentane, n-hexane, n-heptane, n-octane, and mixtures thereof. It is particularly preferred that the aromatic compound (AC) is toluene and the saturated aliphatic compound is n-pentane or n-heptane.

Further the saturated aliphatic compound, preferably n-pentane, is also inert in relation to the compounds of the solid catalyst system to be produced. The term "inert in relation to the compounds" means herein that the aliphatic compound, preferably the n-pentane, is chemically inert, i.e. undergoes no chemical reaction with the solid catalyst system (CS) and the compounds provided besides the aromatic compound (AC) for preparing the catalyst system (CS), i.e. the organo-silicon compound (OS) and the aluminoxane (A)).

The addition of the saturated aliphatic compound to the emulsion can be accomplished as known in the art, for instance by pouring the saturated aliphatic compound into the emulsion. Typically after addition the obtained mixture is agitated (stirred) to facilitate the formation of the solid catalyst system (CS) particles. No specific temperature is needed. Precipitation can be accomplished in a broad temperature range, like 2 to 80° C. Optimal temperature is dependent on the individual components employed. The optimal precipitating temperature can vary e.g. from below 10 to above 50° C. Very good results are achievable at temperatures between 10 and 40° C., or between 15 and 35° C., like 20 to 30° C.

Alternatively the emulsion is introduced very fast into the saturated aliphatic compound, like spray-technology. This way of forming the solid catalyst system (CS) particles has the advantage that very spherical particles are obtained compared to simple pouring technique.

In one embodiment, the saturated aliphatic solvent is present in a solidification vessel and the emulsion product of step (iii) is present in an emulsification vessel. The product of step (iii) is transferred into the solidification vessel to allow precipitation to take place.

Step (v)

Optionally the process of the present invention comprises a step (step (v)), which is recovering the particles of the solid catalyst system (CS). In other words particles of the solid catalyst system (CS) which is obtained by the precipitation step (iv) may be separated and recovered by any procedure known in the art. For example, the solid catalyst particles in the suspension may be filtered. Other commonly known methods for isolating are decanting, centrifuging and flotation. The particles of solid catalyst system (CS) may then be optionally washed and/or dried to remove any solvent residuals present in the particles. The washing and/or drying of the catalyst particles may be carried out in any manner conventional in the art.

Furthermore, each of the steps, i.e. steps (i) to (v), is preferably accomplished at a temperature in the range of 10 to 30° C., preferably in the range of 20 to 30° C.

The instant process leads to a solid catalyst system (CS), in particular to solid catalyst system (CS) without any need of using external support material. In other words a process is described wherein the solid catalyst system (CS) is unsupported, i.e. during the process no carrier material is added.

The present invention is also directed at a solid catalyst system (CS) obtained by the process of the invention.

All preferred embodiments of reactants as disclosed above are valid to the preparation of catalyst system as well to catalyst system as such.

In an embodiment a solid catalyst system (CS) is preferred, wherein mol-ratio between the aluminum (Al) of the aluminoxane (A) and the transition metal (M) of the organometallic compound (C) [(Al)/(M)] is ≤600, more preferred ≤500, even more preferred ≤450. Furthermore, it is preferred that the mol-ratio between aluminum (Al) of the aluminoxane (A) and transition metal (M) of the organometallic compound (C) [(Al)/(M)] is ≥50, more preferred ≥100, even more preferred ≥150. In other words it is preferred that the mol-ratio between aluminum (Al) of the aluminoxane (A) and transition metal (M) of the organometallic compound (C) [(Al)/(M)] is in a range from 50 to 600, preferably in a range from 100 to 600, like 120 to 500.

The present invention is also directed at a solid catalyst system (CS) prepared according to above process, wherein the organo-silicon compound (OS) is preferably selected from the group consisting of octamethyltrisiloxane, decamethyltetrasiloxane, octamethylcyclotetrasiloxane, methoxytrimethylsilane and tetraethoxysilane include tetra-methoxysilane, tetraphenoxysilane-ethoxytrimethylsilane, hexamethyldisiloxane, hexaethyldisiloxane, hexaphenyldisiloxane, tetramethyldiphenyldisiloxane, dimethyltetraphenyldisiloxane, hexamethylcyclotrisiloxane, octaphenylcyclotetrasiloxane, dodecamethylpentasiloxane and tetradecamethylhexasiloxane, 1,3,3,5-tetramethyl-1,1,5,5-tetraphenyltrisiloxane, 1,1,1,5,5,5-hexamethyl3,3-diphenyltrisiloxane, 1,1,1,3,5,5,5-heptamethyl-3-phenyltrisiloxane; and/or the aromatic compound (AC) is toluene; and/or the saturated aliphatic compund is selected from the group consisting of n-pentane, n-hexane, n-heptane, n-octane, and mixtures thereof.

Polymerisation

The present invention is also directed at the use of a solid catalyst system (CS) for the preparation of a polymer, like polyethylene and/or polypropylene.

Furthermore, the present invention is also directed at the preparation of a polymer, like a polypropylene or polyethylene, by polymerising monomer units, like propylene and/or ethylene in the presence of a solid catalyst system (CS) as defined above.

Finally, the present invention is also directed at the preparation of a polymer, like a polypropylene, comprising the steps of preparing a solid catalyst system (SC) according to the process described, using said solid catalyst system (SC) in a polymerisation process, thereby obtaining the polymer, like the polypropylene.

The solid catalyst particles obtained may have an average size range of 1 to 500 µm, particularly 5 to 500 µm, advantageously 5 to 200 µm, e.g. 10 to 100 µm, or even 5 to 50 µm, all sizes of which may be usable, depending on the polymerisation the catalyst is used for.

The present method enables to prepare catalyst particles with high catalytic activity. Preferably, the present catalyst particles have also very low porosity and a low surface area, e.g. of less than 50 m$^2$/g, preferably less than 30 m$^2$/g and more preferably less than 20 m$^2$/g.

The catalyst system of the invention can then be used alone or together with an additional cocatalyst (s) in the actual polymerisation step in a manner known in the art.

The olefin to be polymerised using the catalyst system of the invention can be any olefin polymerisable in a coordination polymerisation including an alpha-olefin alone or as a mixture with one or more comonomers. Preferable olefins are ethylene or propene, or a mixture of ethylene or propene with one or more alpha-olefin (s). Preferable comonomers are C2-C12-olefins, preferably C4-C10-olefins, such as 1-butene, isobutene, 1-pentene, 1-hexene, 4-methyl-1-pentene, 1-heptene, 1-octene, 1-nonene, 1-decene, as well as diene, such as butadiene, 1,7-octadiene and 1,4-hexadiene, or cyclic olefins, such as norbornene, and any mixtures thereof.

Polyethene and any copolymers thereof are particularly contemplated, as are polypropylene homopolymers and any copolymers thereof.

Furthermore, the catalyst system of the invention can be used for the polymerisation of long chain branched alpha-olefins (with 4 to 40 C atoms), alone or together with short chain branched alpha-olefins.

Polymerisation may be effected in one or more, e.g. one, two or three polymerisation reactors, using conventional, polymerisation techniques, in particular gas phase, solution phase, slurry or bulk polymerisation. Polymerisation can be a batch or continuous polymerisation process. Generally a combination of slurry (or bulk) and at least one gas phase reactor is preferred, particularly with gas phase operation coming last.

For slurry reactors, the reaction temperature will generally be in the range of 60 to 110° C. (e.g. 85-110° C.), the reactor pressure will generally be in the range 5 to 80 bar (e.g. 50-60 bar), and the residence time will generally be in the range 0.3 to 5 hours (e.g. 0.5 to 2 hours). The diluent used will generally be an aliphatic hydrocarbon having a boiling point in the range −70 to +100 C. In such reactors, polymerisation may, if desired, be effected under supercritical conditions.

For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours. The gas used will commonly be a non-reactive gas such as nitrogen or propane together with monomer (e.g. ethylene or propylene).

Generally the quantity of catalyst used will depend upon the nature of the catalyst, the reactor types and conditions and the properties desired for the polymer product. Conventional catalyst quantities, such as described in the publications referred herein, may be used.

With the method of the invention a catalyst system with a high bulk density and a good morphology is obtained and the catalyst exhibits a high catalytic activity. The bulk density and morphology correlate with product bulk density and morphology—the so-called "replica effect". Thus the catalyst leads to a polymer with a higher bulk density than obtained with homogeneous systems of the prior art, without using an external support material. Accordingly, the catalyst of the method of the invention combines the advantages of the prior art homogeneous and heterogeneous catalyst systems.

Considering the information provided above, the following embodiments are especially preferred:

A process wherein the mol-ratio between the aluminum (Al) of the aluminoxane (A) and the transition metal (M) of the organometallic compound (C) [(Al)/(M)] is in the range of 50 to 600.

A process wherein the organo-silicon compound (OS) is selected from the group consisting of octamethyltrisiloxane, decamethyltetrasiloxane, octamethylcyclotetrasiloxane, methoxytrimethylsilane, tetraethoxysilane and 1,1,1,3,5,5,5-heptamethyl-3-phenyltrisiloxane.

A process wherein
(a) the aromatic compound (AC) is toluene; and/or
(b) the saturated aliphatic compound is selected from the group consisting of n-pentane, n-hexane, n-heptane, n-octane, and mixtures thereof.

A process wherein
(a) step (i), i.e. the mixing of aluminoxane (A), an aromatic compound (AC) and an organo-silicon compound (OS), is accomplished at a temperature in the range of −20 to 70° C., preferably in the range of 10 to 40° C.
(b) step (ii), i.e. the mixing of the liquid clathrate (LC) with an organometallic compound (C) is accomplished at a temperature in the range of 0 to 50° C., preferably in the range of 20 to 30° C.

A process wherein
(a) the liquid mixture (MI) is homogeneous; and/or
(b) during the process no carrier material is added.

The invention also envisages a solid catalyst system prepared by a process in which these preferred features are present.

The invention also provides a process for the preparation of a polymer, like a polypropylene or polyethylene, comprising the steps of
(A) preparing a solid catalyst system (SC) as hereinbefore defined and,
(B) using said solid catalyst system (SC) in a polymerisation process thereby obtaining the polymer, like the polypropylene or polyethylene.

The invention will now be described with reference to the following non limiting examples and figures.

EXAMPLES

Figure 1:
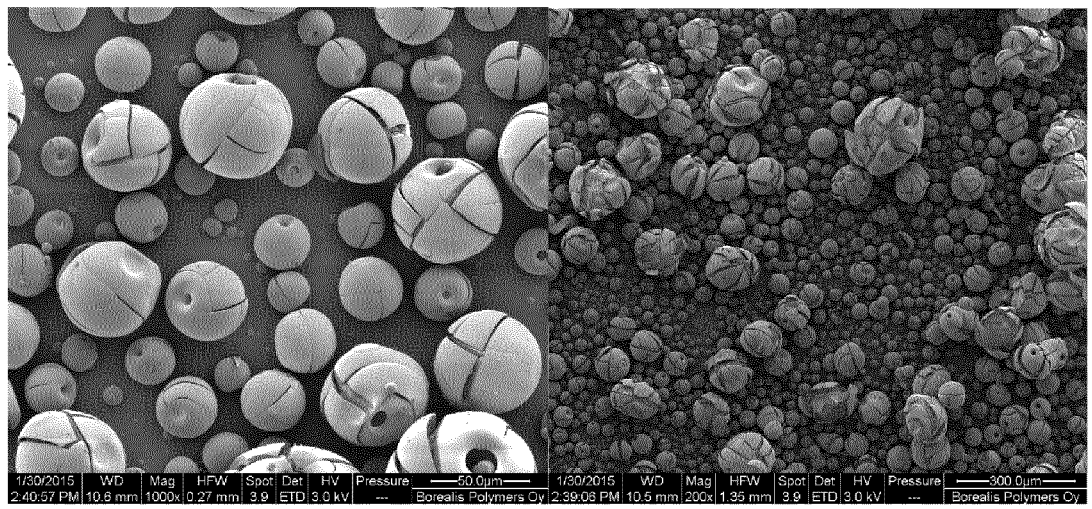
FIG. 1 shows particle morphology for particles of examples 1a and 1b.
Figure 1:
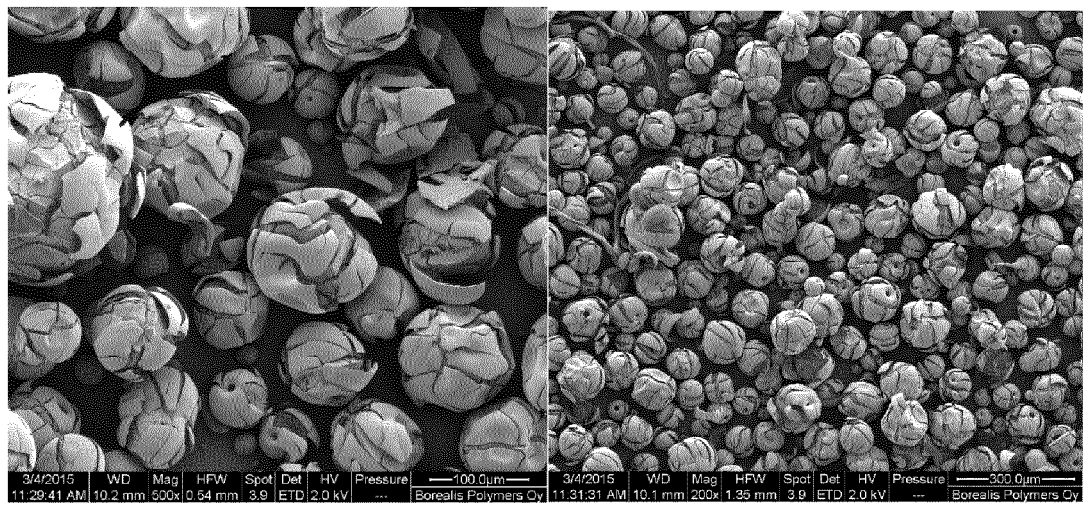

The following definitions of terms and determination methods apply for the above general description of the invention as well as to the below examples, unless otherwise defined.

1. Measuring Methods:

MFR$_2$ (230° C.) is measured according to ISO 1133 (230° C., 2.16 kg load) for polypropylene.

MFR$_2$ (190° C.) is measured according to ISO 1133 (190° C., 2.16 kg load) for polyethylene.

ICP Analysis

The elementary analysis of a catalyst was performed by taking a solid sample of mass, M, cooling over dry ice.

Samples were diluted up to a known volume, V, by dissolving in nitric acid (HNO3, 65%, 5% of V) and freshly deionised (DI) water (5% of V). The solution was then added to hydrofluoric acid (HF, 40%, 3% of V), diluted with DI water up to the final volume, V, and left to stabilise for two hours.

The analysis was run at room temperature using a Thermo Elemental iCAP 6300 Inductively Coupled Plasma—Optical Emission Spectrometer (ICP-OES) which was calibrated using a blank (a solution of 5% HNO3, 3% HF in DI water), and 6 standards of 0.5 ppm, 1 ppm, 10 ppm, 50 ppm, 100 ppm and 300 ppm of Al, with 0.5 ppm, 1 ppm, 5 ppm, 20 ppm, 50 ppm and 100 ppm of Hf and Zr in solutions of 5% HNO3, 3% HF in DI water. Immediately before analysis the calibration is 'resloped' using the blank and 100 ppm Al, 50 ppm Hf, Zr standard, a quality control sample (20 ppm Al, 5 ppm Hf, Zr in a solution of 5% HNO3, 3% HF in DI water) is run to confirm the reslope. The QC sample is also run after every 5th sample and at the end of a scheduled analysis set.

The content of hafnium was monitored using the 282.022 nm and 339.980 nm lines and the content for zirconium using 339.198 nm line. The content of aluminium was monitored via the 167.079 nm line, when Al concentration in ICP sample was between 0-10 ppm (calibrated only to 100 ppm) and via the 396.152 nm line for Al concentrations above 10 ppm.

The reported values are an average of three successive aliquots taken from the same sample and are related back to the original catalyst by inputting the original mass of sample and the dilution volume into the software.

Molecular Weight Averages, Molecular Weight Distribution (Mn, Mw, Mz, MWD)

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-1:2003, ISO 16014-2:2003, ISO 16014-4:2003 and ASTM D 6474-12 using the following formulas:

$$M_n = \frac{\sum_{i=1}^{N} A_i}{\sum_{i=1}^{N} (A_i/M_i)} \quad (1)$$

$$M_w = \frac{\sum_{i=1}^{N} (A_i \times M_i)}{\sum_{i=1}^{N} A_i} \quad (2)$$

$$M_z = \frac{\sum_{i=1}^{N} (A_i \times M_i^2)}{\sum_{i=1}^{N} (A_i/M_i)} \quad (3)$$

For a constant elution volume interval $\Delta V_1$, where $A_i$, and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with either infrared (IR) detector (IR4 or IR5 from PolymerChar (Valencia, Spain) or differential refractometer (RI) from Agilent Technologies, equipped with 3× Agilent-PLgel Olexis and 1× Agilent-PLgel Olexis Guard columns was used. As the solvent and mobile phase 1,2,4-trichlorobenzene (TCB) stabilized with 250 mg/L 2,6-Di tert butyl-4-methyl-phenol) was used. The chromatographic system was operated at 160° C. and at a constant flow rate of 1 mL/min. 200 µL of sample solution was injected per analysis. Data collection was performed using either Agilent Cirrus software version 3.3 or PolymerChar GPC-IR control software.

The column set was calibrated using universal calibration (according to ISO 16014-2:2003) with 19 narrow MWD polystyrene (PS) standards in the range of 0.5 kg/mol to 11 500 kg/mol. The PS standards were dissolved at room temperature over several hours. The conversion of the polystyrene peak molecular weight to polyolefin molecular weights is accomplished by using the Mark Houwink equation and the following Mark Houwink constants:

$K_{PB}=19\times10^{-3}$ mL/g, $\alpha_{PS}=0.655$ $K_{PE}=39\times10^{-3}$ mL/g, $\alpha_{PE}=0.725$ $K_{PP}=19\times10^{-3}$ mL/g, $\alpha_{PP}=0.725$ A third order polynomial fit was used to fit the calibration data.

All samples were prepared in the concentration range of 0.5 to 1.0 mg/ml and dissolved at 160° C. for 2.5 hours for polypropylene or 3 hours for polyethylene under continuous gentle shaking.

Catalyst Productivity

The catalyst productivity is defined as the amount of polymer in kilograms obtained per gram solid catalytic component used (kg polymer/g catalyst).

Catalyst Activity

The catalyst activity is defined as the amount of polymer in kilograms obtained per gram solid catalytic component and polymerisation time (kg polymer/g catalyst×time)

Materials:

MC-1: rac-anti-dimethylsilanediyl(2-methyl-4-(p-tert-butylphenyl)inden-1-yl)(2-methyl-4-phenyl-5-methoxy-6-tert-butyl inden-1-yl) zirconium dichloride (M=772.22 g/mol), CAS no 1418011-81-0. Described in WO2013/007650, metallocene E2.

MAO was purchased from Chemtura and used as a 30 wt-% solution in toluene. Hexadecafluoro-1,3-dimethylcyclohexane (PFC), CAS no335-27-3, was received from commercial source, dried over activated molecular sieves (2 times) and degassed by argon bubbling prior to use.

Propylene is provided by *Borealis* and adequately purified before use.

Triethylaluminum was purchased from Crompton and used in pure form.

Hydrogen is provided by AGA and purified before use.

Dry purified Primol oil was used as received.

Pentane and heptane were degassed by sparging Ar for 30 minutes prior to use.

HDK silica particles were dried under vacuum at 300° C. for 2 hours.

All catalysts and catalyst precursor solutions were handled under inert gas atmosphere using standard Schlenk and glovebox techniques.

Octamethyltrisiloxane (OMTS) was purchased from Aldrich (Octamethyltrisiloxane Mw 236.53 g/mol, CAS 107-51-7) and distilled from $CaH_2$.

Example 1a

Inside the glovebox, 628 mg of HDK-H18 (7 wt % slurry in Toluene) were added dropwise to 2 mL of MAO solution (30 wt % in toluene) in a septum bottle and left to react overnight to form a nanosilica suspension. The following day, 39.10 mg of MC-1 (0,051 mmol, 1 equivalent) were dissolved with 4 mL of the MAO solution in another septum bottle and the solution was stirred for 30 minutes at room temperature inside the glovebox. After 30 minutes, 1.3 mL of the nanosilica suspension and the 4 mL of the MAO-metallocene solution were combined and mixed for 30 minutes. Total amount of MAO was 5 mL (300 equivalents Al vs Zr). The resulting mixture was added into a 50 mL emulsification glass reactor containing 40 mL of PFC at −10° C. and equipped with an overhead stirrer (stirring speed=600 rpm). Total amount of MAO is 5 mL. A red-orange emulsion formed immediately (measured emulsion stability <3 seconds) and stirred during 15 minutes at 0° C./600 rpm. Then the emulsion was transferred via a ⅔ teflon tube to 100 mL of hot PFC at 70° C., and stirred at 600 rpm until the transfer is completed, then the speed was reduced to 300 rpm. After 15 minutes stirring, the oil bath was removed and the stirrer turned off. The catalyst was left to settle up on top of the PFC and after 45 minutes the solvent was siphoned off. The remaining red catalyst was dried during 2 hours at 50° C. over an argon flow. A red free flowing powder was collected.

Example 1b

The same reactants are used as in example 1a but the reaction order is changed. 4 mL of the MAO-metallocene solution was added into a 50 mL emulsification glass reactor containing 40 mL of PFC at −10° C. and equipped with an overhead stirrer (stirring speed=600 rpm). Subsequently, 1.3 ml of the nanosilica suspension in MAO-toluene solution was added to the stirred emulsion.

Morphology of the catalysts of examples 1a and 1b are disclosed in FIG. 1

Example 2a

In a glovebox, OMTS (481 mg) is weighed into the 20 mL reaction bottle. And Albemarle MAO (30 wt % in toluene, 14.0 mL) was added. The bottle is stirred for 2 h. The upper (toluene) layer is collected with a pipette or a syringe and discarded. The lower layer (MAO-toluene clathrate) is washed once with 2 mL of toluene. Metallocene MC-1 (265 mg, Al:Zr=200:1) is added to an isolated liquid clathrate phase obtained in step 3. The bottle is then sealed and the mixture is stirred at room temperature (rt) for 48 hours. Previously prepared slurry of HDK H18 particles in toluene (5 wt %, 0.7 mL) and 2 mL of fluorobenzene solvent are added to the catalyst mixture at rt. The mixture is stirred overnight. The following day, two glass reactor equipped with an overhead stirrer and connected via a Teflon cannula are assembled. Primol (2 mL) and toluene (8 mL) of toluene are charged into the emulsification reactor. The stirrer set to 600 rpm at room temperature. Heptane (50 mL) and then primol (50 mL) are placed into the solidification vessel. The stirrer of vessel is set to 800 rpm. The catalyst solution is added to the emulsion reactor and the mixture is stirred for 10 minutes. The emulsion is siphoned into the precipitation vessel by using the teflon cannula. The stirring in solidification vessel is continued for 10 minutes. The stirring is stopped and the catalyst is allowed to settle for 30 min. The solvent is siphoned off and discarded. Pentane (50 mL) is added to the reactor, the slurry is stirred for 5 min and allowed to settle. Pentane is discarded and the washing is repeated two more times. The catalyst is dried in the Ar flow at 40° C. Isolated yield was 2.7 g in this experiment.

Example 2b

The procedure of example 2a was repeated, however, the HDK particle slurry and the solvent were added to the emulsification reactor prior to addition of the clathrated MAO-metallocene solution.

Several protocols of addition of the HDK particles were explored (Ex A, B, C, D) as indicated in Table 1.

In example 2a, the particles were part of a toluene slurry with MAO, which was in turn precontacted with the clathrated MAO-metallocene solution.

In example 2b, the HDK particle slurry and the solvent were added to the emulsification reactor prior to addition of the clathrated MAO-metallocene solution.

Comparative Example 1

Figure 2:
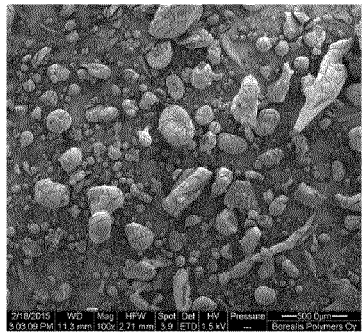
FIG. 2 shows particle morphology for particles of example 2a/b and comparative example 1.
Figure 2:
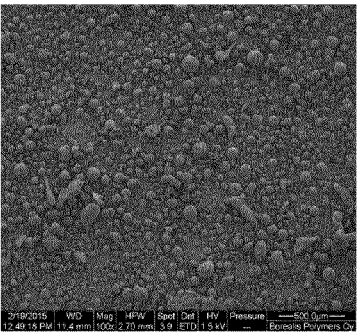
Figure 2:
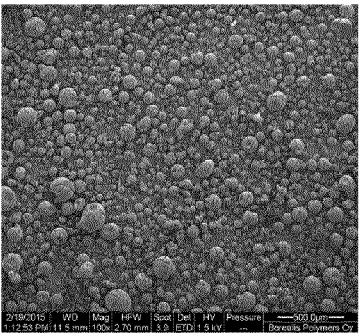
Figure 2:
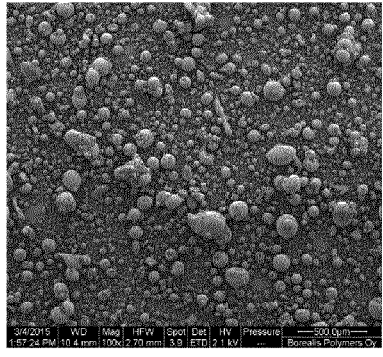
Figure 2:
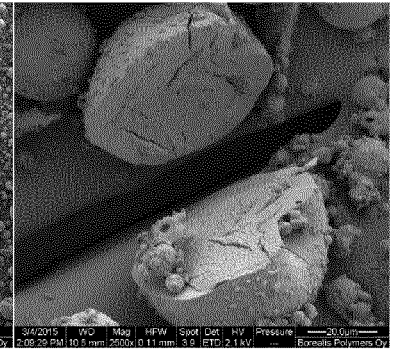

The process of Example 2 was repeated but without the nanosilica. Compared to the comparative catalyst without the nanosilica material,
the degree of morphology control was clearly better.
The polymerizationproductivity of the catalysts utilizing the nanosilica (2a and 2b) was higher than the catalyst without nanosilica (comparative 1).
Morphology of catalysts of example 2a and 2b (Ex A, B, D) and Comparative example 1 is disclosed in FIG. 2.
Results are presented in table 1

TABLE 1

| | HDK H18 Vs MAO, wt %[a] | HDK addition protocol | Zr, wt % | Al, wt % | Si, wt %[b] | Productivity kg PP/g cat | MFR$_2$, dg/min |
|---|---|---|---|---|---|---|---|
| Comp 1 | 0 | — | 0.55 | 39.6 | 0.0 | 5.1 | 9.97 |
| Ex A | 2 | 2b | 0.56 | 36.1 | 0.75 | 10.7 | 6.0 |
| Ex B | 2 | 2a | 0.71 | 38.2 | 0.75 | 11.8 | 5.79 |
| Ex C | 4 | 2a | 0.72 | 38.3 | 1.10 | — | — |
| Ex D | 2 | 2a | 0.88 | 39.2 | 0.88 | NA | NA |
| Ex 1a | 2 | 1a | NA | NA | NA | 6.5 | 11.7 |
| Ex 1b | 2 | 1b | 0.30 | 39.4 | 0.25 | NA | NA |

[a]Weight of solid HDK relative to MAO, solid basis.
[b]Determined by ICP-OES after acid digestion and evaporation of the sample.

The invention claimed is:
1. A process for the preparation of a solid olefin polymerization catalyst or a solid olefin polymerization catalyst component, the process comprising the steps of:
(a) forming a liquid/liquid emulsion of:
(i) a first organic liquid comprising at least one olefin polymerization catalyst component, and
(ii) an optionally halogenated hydrocarbon liquid immiscible therewith;
wherein the liquid/liquid emulsion comprises a dispersed phase and a continuous phase,
wherein the first organic liquid forms the dispersed phase and the optionally halogenated hydrocarbon liquid forms the continuous phase of the liquid/liquid emulsion, and
wherein the dispersed phase forms droplets in the continuous phase; and
(b) transforming the droplets of the dispersed phase to solid particulate particles comprising the at least one olefin polymerization catalyst component, wherein the liquid/liquid emulsion is stabilized with a solid particulate stabilizer.

2. The process according to claim 1, wherein the optionally halogenated hydrocarbon liquid comprises a fluorinated hydrocarbon solvent.

3. The process according to claim 2, wherein the fluorinated hydrocarbon solvent comprises a semi or perfluorinated hydrocarbon, or a hydrocarbon wherein the majority of the —C—H units are replaced with —C—F units.

4. The process according to claim 3, wherein the fluorinated hydrocarbon solvent comprises a perfluorohydrocarbon.

5. The process as claimed in claim 1, wherein transforming the droplets of the dispersed phase to solid particulate particles is effected by a temperature change.

6. A process for the preparation of a solid catalyst system (CS), the process comprising the steps of:
(i) preparing a liquid clathrate (LC) by mixing an aluminoxane (A), an aromatic compound (AC), and a polarity modifier (PM);
(ii) mixing the liquid clathrate (LC) with an organometallic compound (C) to obtain a liquid mixture (MI);
(iii) contacting the liquid mixture (MI) with a hydrocarbon liquid immiscible with the liquid mixture (MI), in the presence of a solid particulate stabilizer to form a liquid/liquid emulsion system, which comprises the liquid mixture (MI) dispersed in the hydrocarbon liquid;
(iv) precipitating the solid catalyst system (CS) out of the liquid/liquid emulsion system by adding a saturated aliphatic compound to the liquid/liquid emulsion system; and
(v) optionally recovering the solid catalyst system (CS), wherein the solid catalyst system (CS) comprises solid particles.

7. The process as claimed in claim 6, wherein the liquid mixture (MI) is contacted with the solid particulate stabilizer to form a catalyst mixture (CM), and the liquid/liquid emulsion is formed by contacting the catalyst mixture (CM) with the hydrocarbon liquid, which is immiscible with the catalyst mixture (CM).

8. The process according to claim 6, wherein the organometallic compound (C) comprises a transition metal and the mol-ratio between the aluminum (Al) of the aluminoxane (A) and the transition metal (M) of the organometallic compound (C), [(Al)/(M)], is in the range of 50 to 600.

9. The process according to claim 6, wherein the polarity modifier (PM) is an organo-silicon compound (OS).

10. The process as claimed in claim 9, wherein the organo-silicon compound (OS) is selected from the group consisting of octamethyltrisiloxane, decamethyltetrasiloxane, octamethylcyclotetrasiloxane, methoxytrimethylsilane, tetraethoxysilane, and 1,1,1,3,5,5,5-heptamethyl-3-phenyltrisiloxane.

11. The process according to claim 6, wherein
(a) the aromatic compound (AC) is toluene; or
(b) the saturated aliphatic compound is selected from the group consisting of n-pentane, n-hexane, n-heptane, n-octane, and mixtures thereof; or
(c) the aromatic compound (AC) is toluene and the saturated aliphatic compound is selected from the group consisting of n-pentane, n-hexane, n-heptane, n-octane, and mixtures thereof.

12. The process according to claim 9, wherein
(a) in step (i), the mixing of the aluminoxane (A), the aromatic compound (AC), and the organo-silicon compound (OS) is accomplished at a temperature in the range of −20 to 70° C.;
(b) in step (ii), the mixing of the liquid clathrate (LC) with the organometallic compound (C) is accomplished at a temperature in the range of 0 to 50° C.

13. The process according to claim 6, wherein the liquid mixture (MI) is homogeneous.

14. The process according to claim 1, wherein the at least one olefin polymerization catalyst component comprises an aluminoxane and there is 0.5 to 8.0 wt % of the solid particulate stabilizer based on the weight of the aluminoxane.

15. The process according to claim 1, wherein the solid olefin polymerization catalyst comprises an organometallic compound (C) of formula (I)

$(L)_mR_nMX_q$       (I)

wherein
"M" is a transition metal (M) of group 3 to 10 of the Periodic Table (IUPAC 2007),
each "X" is independently a mono anionic ligand,
each "L" is independently an organic ligand which coordinates to the transition metal "M",
"R" is a bridging group linking the organic ligands (L),
"m" is 1, 2 or 3,
"n" is 0, 1 or 2,
"q" is 1, 2 or 3, and
m+q is equal to the valency of the transition metal (M).

16. The process according to claim 1, wherein the solid particulate stabilizer is a nanoparticulate material.

17. The process according to claim 1, wherein the solid particulate stabilizer is a hydrophobic nanosilica.

18. The process according to claim 6, further comprising recovering the solid particles of the solid catalyst system, wherein the solid particles have an average size range of 5 to 200 μm.

19. A solid catalyst obtained according to the process of claim 1.

20. The solid catalyst according to claim 19, wherein the solid catalyst comprises 0.25 to 4.0 wt % of the solid particulate stabilizer.

21. A process for the preparation of a polymer by polymerizing monomers in the presence of the solid catalyst as defined in claim 19.

22. A process comprising the steps of:
(A) preparing a solid catalyst according to the process of claim 1,
(B) conducting polymerization in the presence of the solid catalyst of claim 1 to obtain a polymer.

23. The process according to claim 4, wherein the fluorinated hydrocarbon solvent comprises a C3-C30 perfluoroalkane, -alkene or -cycloalkane.

24. The process according to claim 4, wherein the fluorinated hydrocarbon solvent comprises a C4-C10 perfluoroalkane, -alkene or -cycloalkane.

25. The process according to claim 4, wherein the fluorinated hydrocarbon solvent comprises perfluorohexane, perfluoroheptane, perfluorooctane, perfluoro(methylcyclohexane), or a mixture thereof.

26. The process according to claim 6, wherein in step (i) the mol ratio between the polarity modifier (PM) and the aluminum (Al) of the aluminoxane (A), [(PM)/(Al)], is equal to or below 0.1.

27. The process according to claim 6, wherein in step (iii) the hydrocarbon liquid immicible with the liquid mixture (MI) is an aromatic solvent.

28. The process according to claim 12, wherein in step (i), the mixing of the aluminoxane (A), the aromatic compound (AC), and the organo-silicon compound (OS) is accomplished at a temperature in the range of 10 to 40° C.

29. The process according to claim 12, wherein in step (ii), the mixing of the liquid clathrate (LC) with the organometallic compound (C) is accomplished at a temperature in the range of 20 to 30° C.

30. The process according to claim 15, wherein each "X" is independently a σ ligand.

31. The process according to claim 15, wherein "m" is 2.

32. The process according to claim 15, wherein "n" is 1.

33. The process according to claim 15, wherein "q" is 2.

34. The process according to claim 18, wherein the solid particles have an average size range of 10 to 100 μm.

35. The process according to claim 21, wherein the polymer is polypropylene or polyethylene.

36. The process according to claim 22, wherein the polymer is polypropylene or polyethylene.

* * * * *